US011785659B2

(12) United States Patent
Lim et al.

(10) Patent No.: US 11,785,659 B2
(45) Date of Patent: Oct. 10, 2023

(54) METHOD FOR APPLYING MSD AND APPARATUS THEREOF

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR); Jongkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/766,079

(22) PCT Filed: Sep. 25, 2020

(86) PCT No.: PCT/KR2020/013140
§ 371 (c)(1),
(2) Date: Apr. 1, 2022

(87) PCT Pub. No.: WO2021/066430
PCT Pub. Date: Apr. 8, 2021

(65) Prior Publication Data
US 2022/0369405 A1 Nov. 17, 2022

(30) Foreign Application Priority Data
Oct. 4, 2019 (KR) .......................... 10-2019-0123240

(51) Int. Cl.
*H04W 76/16* (2018.01)
*H04B 17/336* (2015.01)
(52) U.S. Cl.
CPC .......... *H04W 76/16* (2018.02); *H04B 17/336* (2015.01)

(58) Field of Classification Search
CPC .............................. H04W 76/16; H04B 17/336
See application file for complete search history.

(56) References Cited

U.S. PATENT DOCUMENTS

| 2017/0054535 A1* | 2/2017 | Lim | ................. | H04W 72/0453 |
| 2017/0318587 A1* | 11/2017 | Lim | ....................... | H04L 5/001 |

(Continued)

FOREIGN PATENT DOCUMENTS

| KR | 20190029444 | 3/2019 |
| KR | 20190057273 | 5/2019 |
| WO | 2019098236 | 5/2019 |

OTHER PUBLICATIONS

LG Electronics, "TD on MSD results for EN-DC LTE x bands DL and 1UL (x=1,2,3,4) + NR 2 bands DL and 1UL DC UE," 3GPP TSG-RAN WG4 #90BIS, R4-1903011, Apr. 2019, 7 pages.

(Continued)

*Primary Examiner* — Zhiren Qin
(74) *Attorney, Agent, or Firm* — LEE, HONG, DEGERMAN, KANG & WAIMEY PC

(57) ABSTRACT

A disclosure of this specification provides a device configured to operate in a wireless system. The device may comprise: a transceiver configured with an Evolved Universal Terrestrial Radio Access (E-UTRA)-New Radio (NR) Dual Connectivity (EN-DC). The EN-DC may be configured to use three bands. The device may comprise: a processor operably connectable to the transceiver. The processer may be configured to: control the transceiver to receive a downlink signal and control the transceiver to transmit an uplink signal via at least two bands among the three bands. A value of Maximum Sensitivity Degradation (MSD) may be applied to a reference sensitivity. The value of the MSD may be pre-configured for one or more band combinations.

19 Claims, 33 Drawing Sheets

(56) References Cited

U.S. PATENT DOCUMENTS

| | | | |
|---|---|---|---|
| 2019/0230663 A1* | 7/2019 | Lim | H04W 72/0453 |
| 2021/0376989 A1* | 12/2021 | Lim | H04B 17/345 |
| 2022/0225080 A1* | 7/2022 | Ng | H04W 76/11 |

OTHER PUBLICATIONS

NTT Docomo, Inc., "Big CR for EN-DC of LTD 1band + NR 1band," 3GPP TSG-RAN WG4 #92, R4-1910322, Aug. 2019, 93 pages.

PCT International Application No. PCT/KR2020/013140, International Search Report dated Dec. 23, 2020, 2 pages.

* cited by examiner

METHOD FOR APPLYING MSD AND APPARATUS THEREOF

CROSS-REFERENCE TO RELATED APPLICATIONS

This application is the National Stage filing under 35 U.S.C. 371 of International Application No. PCT/KR2020/013140, filed on Sep. 25, 2020, which claims the benefit of earlier filing date and right of priority to Korean Application No. 10-2019-0123240, filed Oct. 4, 2019, the contents of which are all incorporated by reference herein in their entirety.

TECHNICAL FIELD

The present disclosure relates to mobile communication.

BACKGROUND

With the success in the Evolved Universal Terrestrial Radio Access Network (E-UTRAN) for 4th generation mobile communication, i.e., long term evolution (LTE)/LTE-Advanced (LTE-A), interest in the next-generation, i.e., 5th generation (also known as 5G) mobile communication is rising, and extensive research and development are in process.

A new radio access technology (New RAT or NR) is being researched for the 5th generation (also known as 5G) mobile communication.

A frequency band for NR may be defined as two types (FR1 and FR2) of frequency ranges. FR1 may include a range from 410 MHz to 7125 MHz. That is, FR1 may include a frequency band of 6 GHz or greater (or 5850, 5900, 5925 MHz, or the like). For the convenience of description, FR1 may refer to a "sub-6-GHz range", FR2 may refer to an "above-6-GHz range" and may be referred to as a millimeter wave (mmWave).

A mobile device should be configured to satisfy a reference sensitivity power level (REFSENS) which is the minimum average power for each antenna port of the mobile device when receiving the downlink signal.

When a harmonics component and/or an intermodulation distortion (IMD) component occurs, there is a possibility that the REFSENS for the downlink signal may not be satisfied due to the uplink signal transmitted by the mobile device.

SUMMARY

Accordingly, a disclosure of the specification has been made in an effort to solve the aforementioned problem.

In accordance with an embodiment of the present disclosure, a disclosure of this specification provides a device configured to operate in a wireless system. The device may comprise: a transceiver configured with an Evolved Universal Terrestrial Radio Access (E-UTRA)-New Radio (NR) Dual Connectivity (EN-DC). The EN-DC may be configured to use three bands. The device may comprise: a processor operably connectable to the transceiver. The processer may be configured to: control the transceiver to receive a downlink signal and control the transceiver to transmit an uplink signal via at least two bands among the three bands. A value of Maximum Sensitivity Degradation (MSD) may be applied to a reference sensitivity. The value of the MSD may be pre-configured for one or more band combinations, the one or more of band combinations include a first combination of bands 39, n41 and n79, a second combination of bands 2, n66 and n78, a third combination of bands 7, n66 and n78, a fourth combination of bands 2, n41 and n71, a fifth combination of bands 18, n3 and n78, a sixth combination of bands 8, n1 and n78, a seventh combination of bands 3, n40 and n79, an eighth combination of bands 3, n41 and n79, a ninth combination of bands 8, n40 and n79, a tenth combination of bands 8, n41 and n79, an eleventh combination of bands 39, n40 and n79 or a twelfth combination of bands 8, n3 and n28.

In accordance with an embodiment of the present disclosure, a disclosure of this specification provides a method performed by a device. The method may comprise: transmitting an uplink signal via at least two bands among three bands; and receiving a downlink signal. The at least two bands may be configured for an Evolved Universal Terrestrial Radio Access (E-UTRA)-New Radio (NR) Dual Connectivity (EN-DC). A value of Maximum Sensitivity Degradation (MSD) may be applied to a reference sensitivity. The value of the MSD may be pre-configured for one or more band combinations, the one or more of band combinations include a first combination of bands 39, n41 and n79, a second combination of bands 2, n66 and n78, a third combination of bands 7, n66 and n78, a fourth combination of bands 2, n41 and n71, a fifth combination of bands 18, n3 and n78, a sixth combination of bands 8, n1 and n78, a seventh combination of bands 3, n40 and n79, an eighth combination of bands 3, n41 and n79, a ninth combination of bands 8, n40 and n79, a tenth combination of bands 8, n41 and n79, an eleventh combination of bands 39, n40 and n79 or a twelfth combination of bands 8, n3 and n28.

According to a disclosure of the present disclosure, the above problem of the related art is solved.

Effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

DETAILED DESCRIPTION

Figure 1:
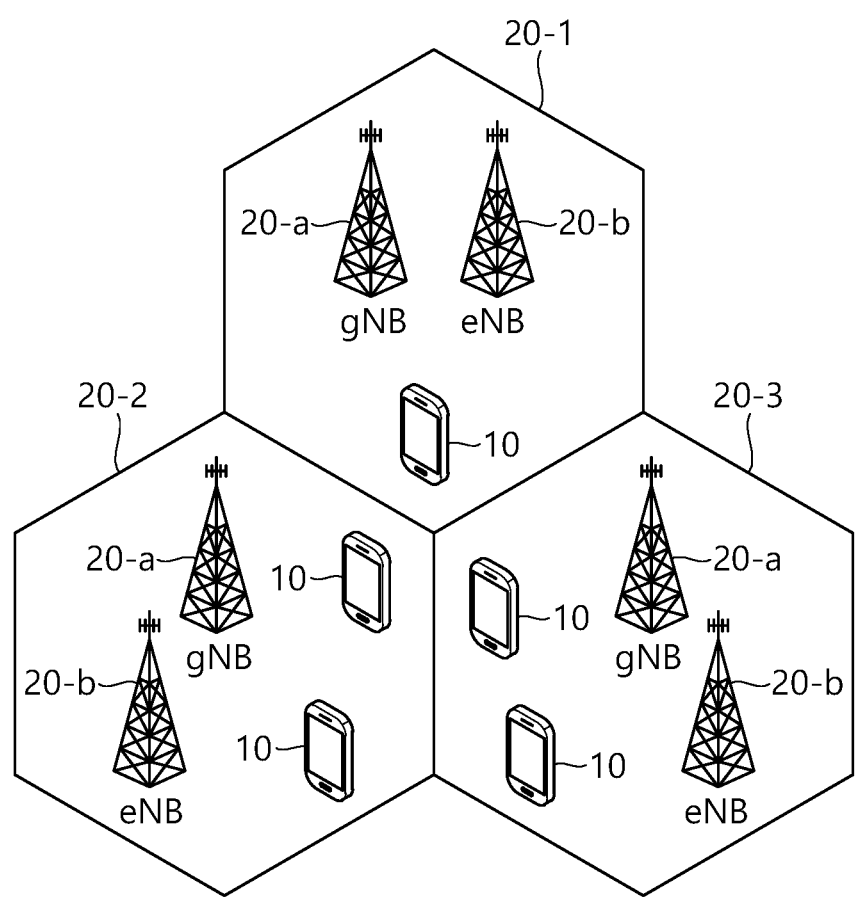
FIG. 1 illustrates a wireless communication system.

Hereinafter, based on 3rd Generation Partnership Project (3GPP) long term evolution (LTE), 3GPP LTE-advanced (LTE-A), 3GPP 5G (5th generation) or 3GPP New Radio (NR), the present specification will be applied. This is just an example, and the present specification may be applied to various wireless communication systems. Hereinafter, LTE includes LTE and/or LTE-A.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Although the present disclosure has been described based on a Universal Mobile Telecommunication System (UMTS), an Evolved Packet Core (EPC), and a next generation (also known as 5th generation or 5G) mobile communication network, the present disclosure will be limited only to the aforementioned communication systems and may, therefore, be applied to all communication system and methods to which the technical scope and spirit of the present disclosure can be applied.

As used herein, "A or B" may mean "only A", "only B", or "both A and B". In other words, "A or B" herein may be understood as "A and/or B". For example, "A, B or C" herein means "only A", "only B", "only C", or "any combination of A, B and C (any combination of A, B and C)"

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C"

As used herein, "at least one of A and B" may mean "only A", "only B", or "both A and B". In addition, the expression "at least one of A or B" or "at least one of A and/or B" may be understood as "At least one of A and B"

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C"

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

As used herein, 'base station' generally refers to a fixed station that communicates with a wireless device and may be denoted by other terms such as eNB (evolved-NodeB), BTS (base transceiver system), gNB (next-generation NodeB), or access point.

As used herein, 'user equipment (UE)' may be an example of a wireless communication device such as stationary or mobile. Also, UE may be denoted by other terms such as device, wireless device, terminal, MS (mobile station), UT (user terminal), SS (subscriber station), MT (mobile terminal) and etc.

<Next-Generation Mobile Communication Network>

The following description of this specification may be applied to a next-generation (also known as 5th generation or 5G) mobile communication network.

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2300.

ITU proposes three usage scenarios, for example, enhanced Mobile Broad Band (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

FIG. 1 illustrates a wireless communication system.

As seen with reference to FIG. 1, the wireless communication system includes at least one base station (BS). The BS is classified into a gNB 20a and an eNB 20b. The gNB 20a is for 5G mobile communication such as NR. And, the eNB 20b is for 4G mobile communication such as LTE or LTE-A.

Each BS (e.g., gNB 20a and eNB 20b) provides a communication service to specific geographical areas (generally, referred to as cells) 20-1, 20-2, and 20-3. The cell can be further divided into a plurality of areas (sectors).

The UE 10 generally belongs to one cell and the cell to which the UE belong is referred to as a serving cell. A BS that provides the communication service to the serving cell is referred to as a serving BS. Since the wireless communication system is a cellular system, another cell that neighbors to the serving cell is present. Another cell which neighbors to the serving cell is referred to a neighbor cell. A BS that provides the communication service to the neighbor cell is referred to as a neighbor BS. The serving cell and the neighbor cell are relatively decided based on the UE.

Hereinafter, a downlink means communication from the BS 20 to the UE 10 and an uplink means communication from the UE 10 to the BS 200. In the downlink, a transmitter may be a part of the BS 20 and a receiver may be a part of the UE 10. In the uplink, the transmitter may be a part of the UE 10 and the receiver may be a part of the BS 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

Figure 2A:
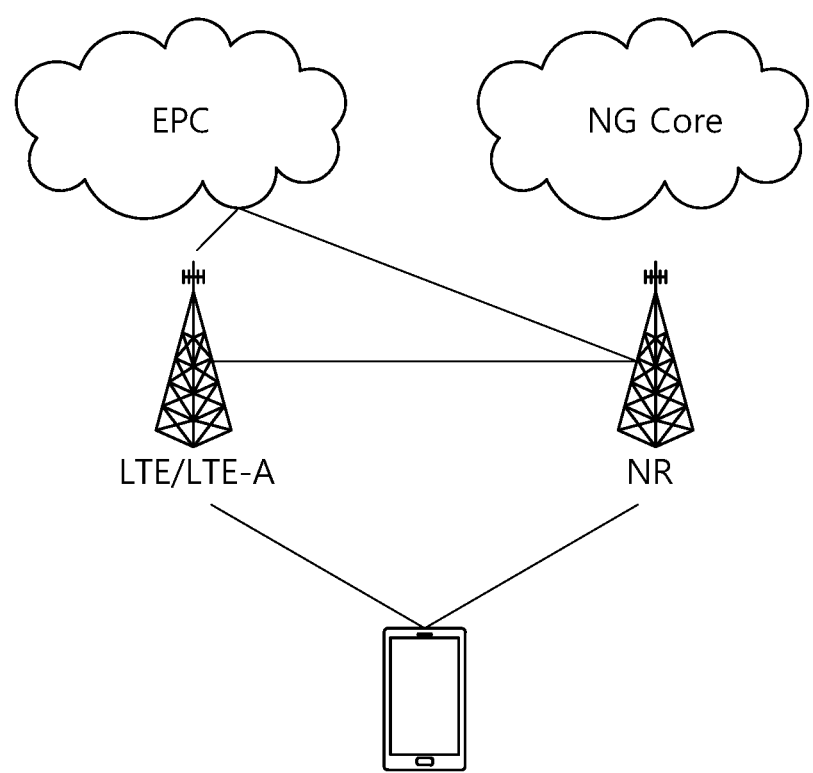
FIGS. 2A to 2C are exemplary diagrams illustrating exemplary architectures for services of the next generation mobile communication.
Figure 2B:
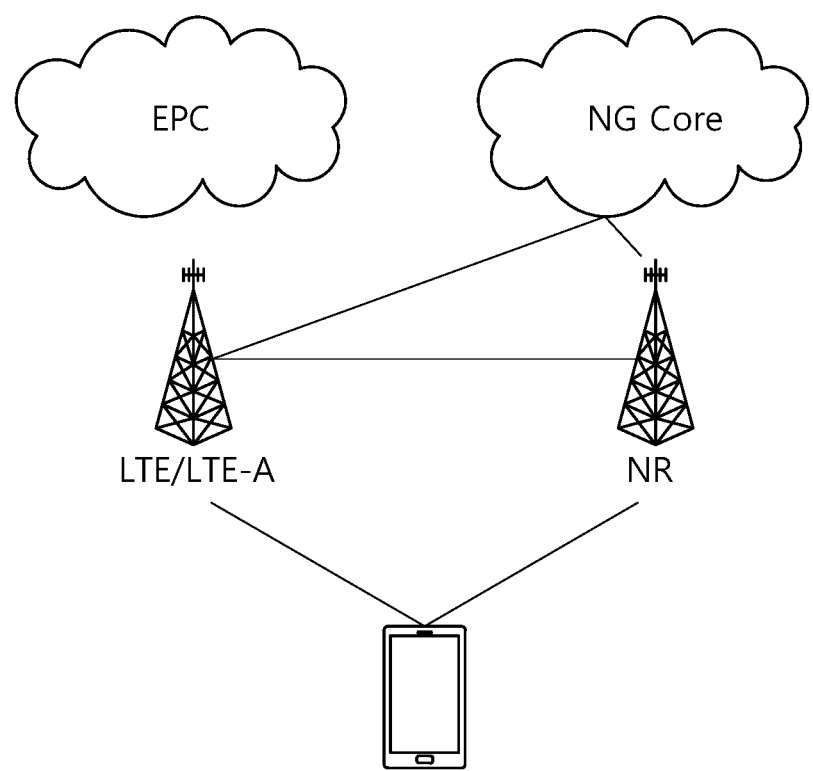
Figure 2C:
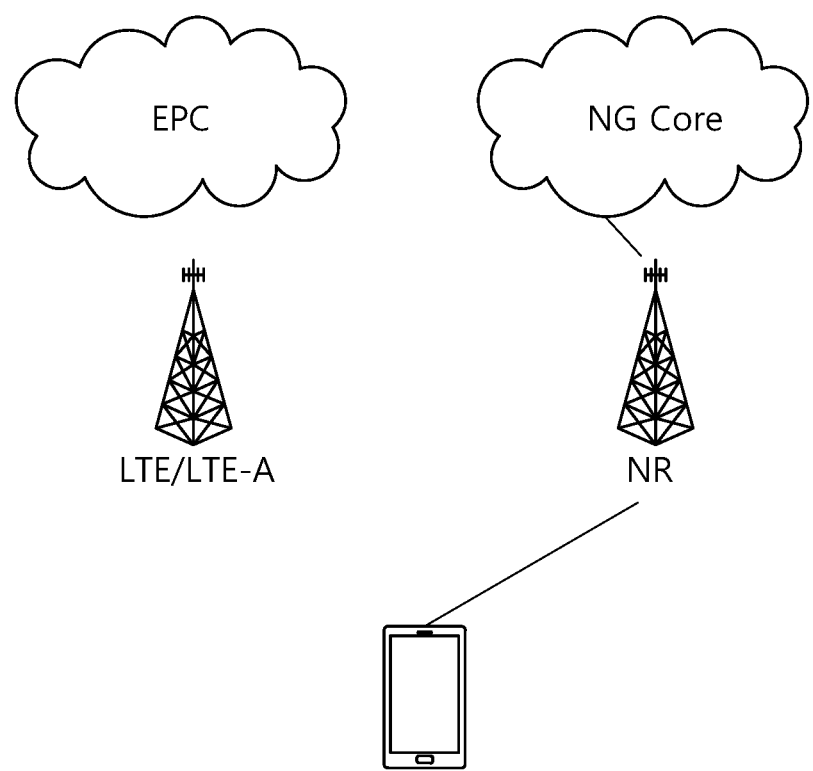

FIGS. 2a to 2c are exemplary diagrams illustrating exemplary architectures for services of the next generation mobile communication.

Referring to FIG. 2a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 2b, unlike FIG. 2a, the LTE/LTE-A based cell is connected to a core network for the 5G mobile communication, that is, a next generation (NG) core network.

The service scheme based on the architecture as illustrated in FIGS. 2a and 2B is called non-standalone (NSA).

Referring to FIG. 2c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

The NR supports a plurality of numerologies (e.g. a plurality of values of subcarrier spacing (SCS)) in order to support various 5G services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The LTE/LTE-A based cell operates in an Evolved Universal Terrestrial Radio Access (E-UTRA) operating band. And, the NR-based cell operates in a NR band. Here, the DC may be called as EN-DC.

The following table is an example of E-UTRA operating bands.

TABLE 1

| E-UTRA Operating Band | Uplink (UL) operating band BS receive UE transmit FUL_low-FUL_high | | | Downlink (DL) operating band BS transmit UE receive FDL_low-FDL_high | | | Duplex Mode |
|---|---|---|---|---|---|---|---|
| 1 | 1920 MHz | — | 1980 MHz | 2110 MHz | — | 2170 MHz | FDD |
| 2 | 1850 MHz | — | 1910 MHz | 1930 MHz | — | 1990 MHz | FDD |
| 3 | 1710 MHz | — | 1785 MHz | 1805 MHz | — | 1880 MHz | FDD |
| 4 | 1710 MHz | — | 1755 MHz | 2110 MHz | — | 2155 MHz | FDD |
| 5 | 824 MHz | — | 849 MHz | 869 MHz | — | 894 MHz | FDD |
| 6 | 830 MHz | — | 840 MHz | 875 MHz | — | 885 MHz | FDD |
| 7 | 2500 MHz | — | 2570 MHz | 2620 MHz | — | 2690 MHz | FDD |
| 8 | 880 MHz | — | 915 MHz | 925 MHz | — | 960 MHz | FDD |
| 9 | 1749.9 MHz | — | 1784.9 MHz | 1844.9 MHz | — | 1879.9 MHz | FDD |
| 10 | 1710 MHz | — | 1770 MHz | 2110 MHz | — | 2170 MHz | FDD |
| 11 | 1427.9 MHz | — | 1447.9 MHz | 1475.9 MHz | — | 1495.9 MHz | FDD |
| 12 | 699 MHz | — | 716 MHz | 729 MHz | — | 746 MHz | FDD |
| 13 | 777 MHz | — | 787 MHz | 746 MHz | — | 756 MHz | FDD |
| 14 | 788 MHz | — | 798 MHz | 758 MHz | — | 768 MHz | FDD |
| 15 | Reserved | | | Reserved | | | FDD |
| 16 | Reserved | | | Reserved | | | FDD |
| 17 | 704 MHz | — | 716 MHz | 734 MHz | — | 746 MHz | FDD |
| 18 | 815 MHz | — | 830 MHz | 860 MHz | — | 875 MHz | FDD |
| 19 | 830 MHz | — | 845 MHz | 875 MHz | — | 890 MHz | FDD |
| 20 | 832 MHz | — | 862 MHz | 791 MHz | — | 821 MHz | FDD |
| 21 | 1447.9 MHz | — | 1462.9 MHz | 1495.9 MHz | — | 1510.9 MHz | FDD |
| 22 | 3410 MHz | — | 3490 MHz | 3510 MHz | — | 3590 MHz | FDD |
| 23 | 2000 MHz | — | 2020 MHz | 2180 MHz | — | 2200 MHz | FDD |
| 24 | 1626.5 MHz | — | 1660.5 MHz | 1525 MHz | — | 1559 MHz | FDD |
| 25 | 1850 MHz | — | 1915 MHz | 1930 MHz | — | 1995 MHz | FDD |
| 26 | 814 MHz | — | 849 MHz | 859 MHz | — | 894 MHz | FDD |
| 27 | 807 MHz | — | 824 MHz | 852 MHz | — | 869 MHz | FDD |
| 28 | 703 MHz | — | 748 MHz | 758 MHz | — | 803 MHz | FDD |
| 29 | N/A | | | 717 MHz | — | 728 MHz | FDD2 |
| 30 | 2305 MHz | — | 2315 MHz | 2350 MHz | — | 2360 MHz | FDD |
| 31 | 452.5 MHz | — | 457.5 MHz | 462.5 MHz | — | 467.5 MHz | FDD |

TABLE 1-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 32 | N/A | 1452 MHz — 1496 MHz | FDD2 |
| 33 | 1900 MHz — 1920 MHz | 1900 MHz — 1920 MHz | TDD |
| 34 | 2010 MHz — 2025 MHz | 2010 MHz — 2025 MHz | TDD |
| 35 | 1850 MHz — 1910 MHz | 1850 MHz — 1910 MHz | TDD |
| 36 | 1930 MHz — 1990 MHz | 1930 MHz — 1990 MHz | TDD |
| 37 | 1910 MHz — 1930 MHz | 1910 MHz — 1930 MHz | TDD |
| 38 | 2570 MHz — 2620 MHz | 2570 MHz — 2620 MHz | TDD |
| 39 | 1880 MHz — 1920 MHz | 1880 MHz — 1920 MHz | TDD |
| 40 | 2300 MHz — 2400 MHz | 2300 MHz — 2400 MHz | TDD |
| 41 | 2496 MHz — 2690 MHz | 2496 MHz — 2690 MHz | TDD |
| 42 | 3400 MHz — 3600 MHz | 3400 MHz — 3600 MHz | TDD |
| 43 | 3600 MHz — 3800 MHz | 3600 MHz — 3800 MHz | TDD |
| 44 | 703 MHz — 803 MHz | 703 MHz — 803 MHz | TDD |
| 45 | 1447 MHz — 1467 MHz | 1447 MHz — 1467 MHz | TDD |
| 46 | 5150 MHz — 5925 MHz | 5150 MHz — 5925 MHz | TDD8 |
| 47 | 5855 MHz — 5925 MHz | 5855 MHz — 5925 MHz | TDD11 |
| 48 | 3550 MHz — 3700 MHz | 3550 MHz — 3700 MHz | TDD |
| 49 | 3550 MHz — 3700 MHz | 3550 MHz — 3700 MHz | TDD16 |
| 50 | 1432 MHz — 1517 MHz | 1432 MHz — 1517 MHz | TDD13 |
| 51 | 1427 MHz — 1432 MHz | 1427 MHz — 1432 MHz | TDD13 |
| 52 | 3300 MHz — 3400 MHz | 3300 MHz — 3400 MHz | TDD |
| 53 | 2483.5 MHz — 2495 MHz | 2483.5 MHz — 2495 MHz | TDD |
| ... | | | |
| 64 | Reserved | | |
| 65 | 1920 MHz — 2010 MHz | 2110 MHz — 2200 MHz | FDD |
| 66 | 1710 MHz — 1780 MHz | 2110 MHz — 2200 MHz | FDD4 |
| 67 | N/A | 738 MHz — 758 MHz | FDD2 |
| 68 | 698 MHz — 728 MHz | 753 MHz — 783 MHz | FDD |
| 69 | N/A | 2570 MHz — 2620 MHz | FDD2 |
| 70 | 1695 MHz — 1710 MHz | 1995 MHz — 2020 MHz | FDD10 |
| 71 | 663 MHz — 698 MHz | 617 MHz — 652 MHz | FDD |
| 72 | 451 MHz — 456 MHz | 461 MHz — 466 MHz | FDD |
| 73 | 450 MHz — 455 MHz | 460 MHz — 465 MHz | FDD |
| 74 | 1427 MHz — 1470 MHz | 1475 MHz — 1518 MHz | FDD |
| 75 | N/A | 1432 MHz — 1517 MHz | FDD2 |
| 76 | N/A | 1427 MHz — 1432 MHz | FDD2 |
| 85 | 698 MHz — 716 MHz | 728 MHz — 746 MHz | FDD |
| 87 | 410 MHz — 415 MHz | 420 MHz — 425 MHz | FDD |
| 88 | 412 MHz — 417 MHz | 422 MHz — 427 MHz | FDD |

An NR frequency band may be defined as two types (FR1 and FR2) of frequency ranges. The frequency ranges may be changed. For example, the two types (FR1 and FR2) of frequency bands are illustrated in Table 2. For the convenience of description, among the frequency bands used in the NR system, FR1 may refer to a "sub-6-GHz range", FR2 may refer to an "above-6-GHz range" and may be referred to as a millimeter wave (mmWave).

TABLE 2

| Frequency Range Designation | Corresponding Frequency Range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the frequency ranges for the NR system may be changed. For example, FR1 may include a range from 410 MHz to 7125 MHz as illustrated in Table 3. That is, FR1 may include a frequency band of 6 GHz or greater (or 5850, 5900, 5925 MHz, or the like). For example, the frequency band of 6 GHz or greater (or 5850, 5900, 5925 MHz or the like) included in FR1 may include an unlicensed band. The unlicensed band may be used for various uses, for example, for vehicular communication (e.g., autonomous driving).

TABLE 3

| Frequency Range Designation | Corresponding Frequency Range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

<Operating Band in NR>

An operating band in NR is as following. Table 4 shows examples of operating bands on FR1. Operating bands shown in Table 4 is a reframing operating band that is transitioned from an operating band of LTE/LTE-A. This operating band may be referred to as FR1 operating band.

TABLE 4

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |

TABLE 4-continued

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2300 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

Table 5 shows examples of operating bands on FR2. The following table shows operating bands defined on a high frequency. This operating band is referred to as FR2 operating band.

TABLE 5

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-283500 MHz | 27500 MHz-283500 MHz | TDD |

Meanwhile, when the operating band shown in the above table is used, a channel bandwidth is used as shown in the following table.

TABLE 6

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table, SCS indicates a subcarrier spacing. In the above table, NRB indicates the number of RBs.

Meanwhile, when the operating band shown in the above table is used, a channel bandwidth is used as shown in the following table.

TABLE 7

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N. A |
| 120 | 32 | 66 | 132 | 264 |

Figure 3:
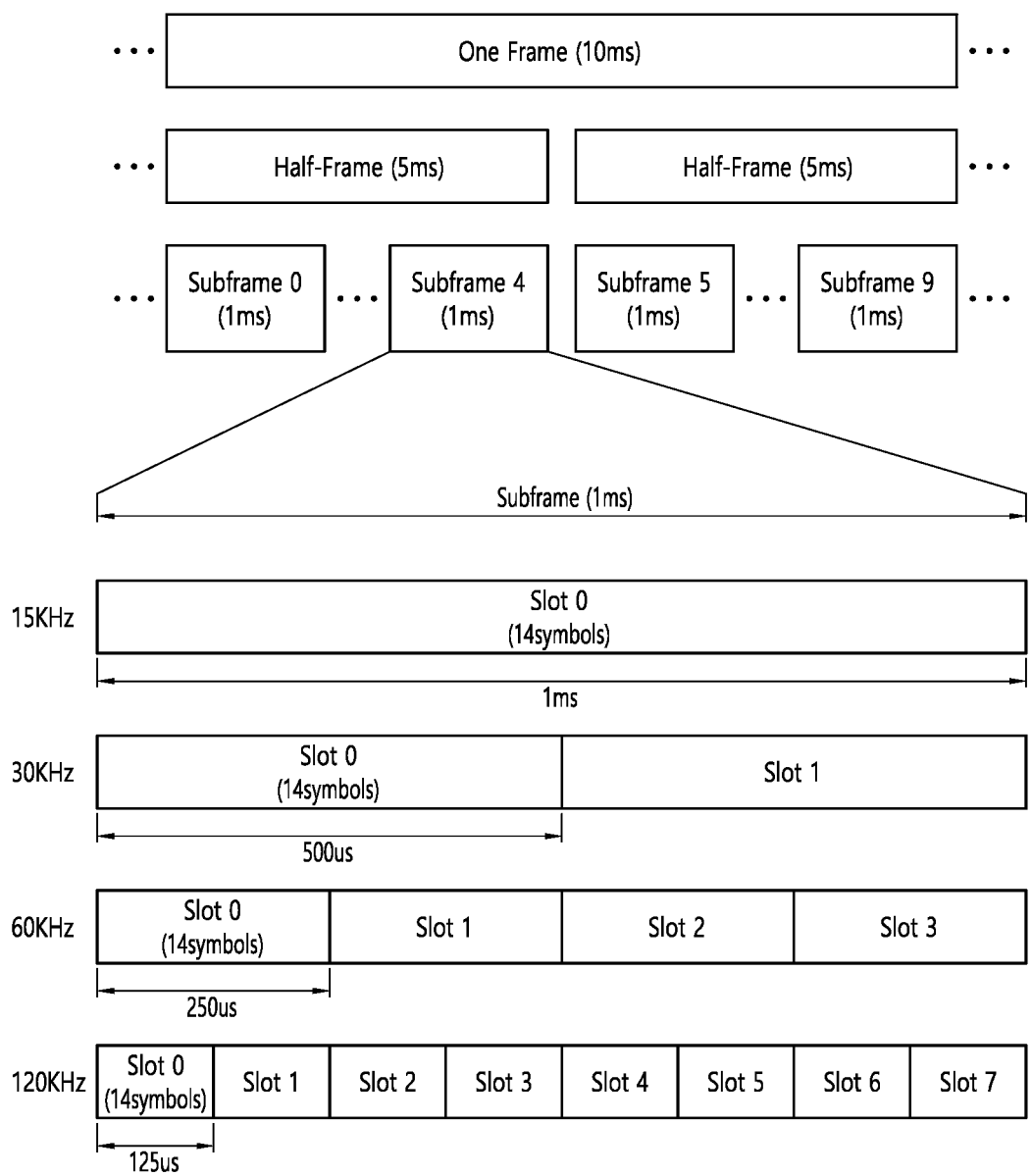
FIG. 3 shows an example of subframe type in NR.

FIG. 3 illustrates an example of a structure of NR radio frame.

As shown in FIG. 3, a radio frame is 10 ms in length and includes two (2) half-frames. The half frame includes five (5) subframes. Each subframe is 1 ms in length. The subframe includes at least one or more slots. The number of slots in the subframe is dependent on a subcarrier spacing (SCS). Each slot includes twelve (12) or fourteen (14) OFDM symbols based on a cycle prefix (CP). Based on a normal CP, the slot includes twelve (12) OFDM symbols. Based on an extended CP, the slot includes fourteen (14) OFDM symbols. Here, the symbol means an OFDM symbols, a CP-OFDM symbol, a SC-FDMA symbol or a DFT-s-OFDM symbol.

Figure 4:
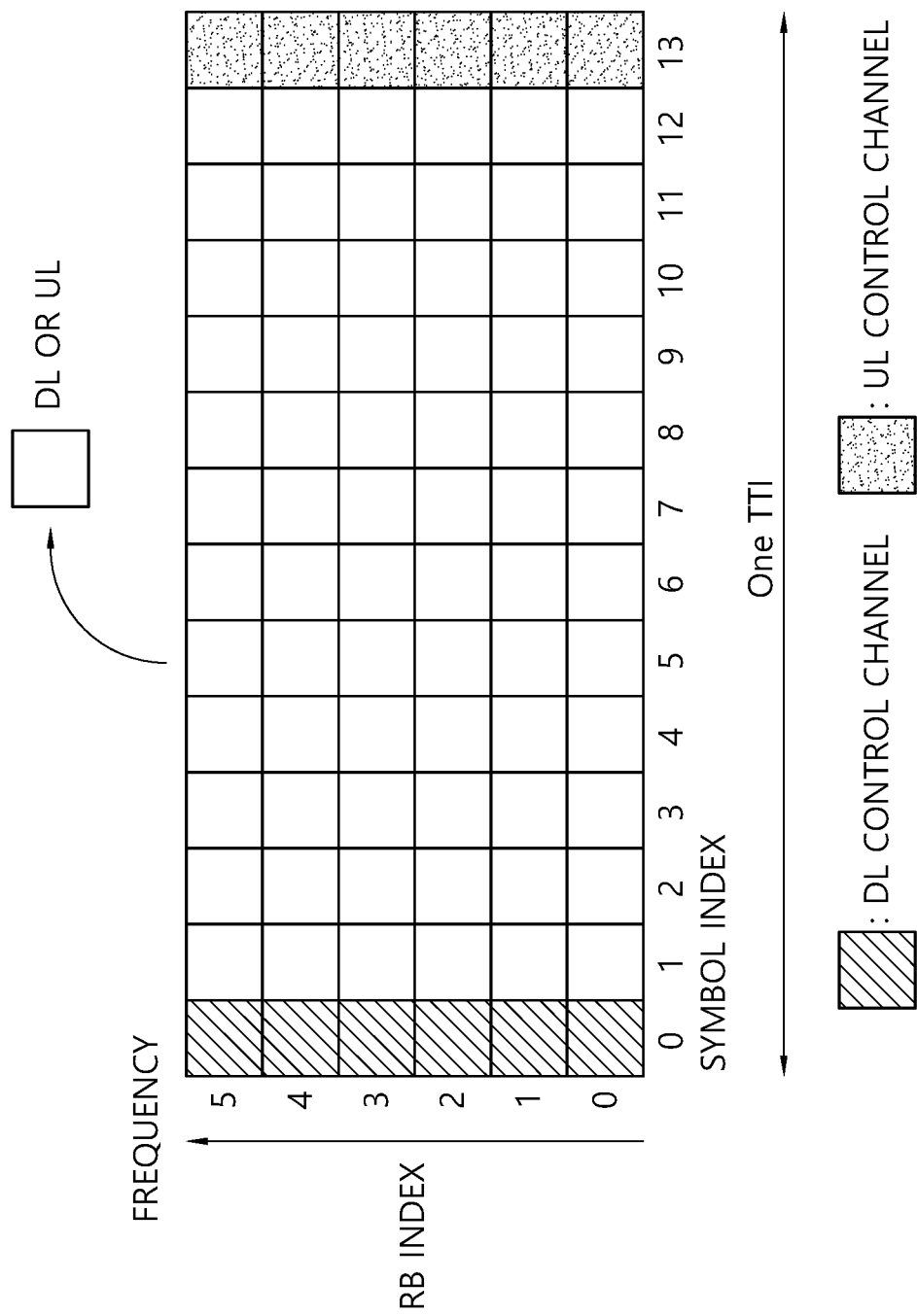
FIG. 4 shows an example of subframe type in NR.

FIG. 4 shows an example of subframe type in NR.

A transmission time interval (TTI) shown in FIG. 4 may be called a subframe or slot for NR (or new RAT). The subframe (or slot) in FIG. 4 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by a subcarrier spacing and a corresponding CP length may be expressed as shown in the following table.

TABLE 8

| M | $\Delta f = 2^{u}*15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by the number of OLDM symbols per slot Nslotsymb, the number of slots per frame Nframe,μslot, and the number of slots per subframe Nsubframe,μslot are expressed as shown in the following table.

TABLE 9

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by the number of OLDM symbols per slot Nslotsymb, the number of slots per frame Nframe,μslot, and the number of slots per subframe Nsubframe,μslot are expressed as shown in the following table.

TABLE 10

| M | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 11

| | Symbol Number in Slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | D | D | D | D | D | D | D | X |
| 47 | D | D | D | D | D | X | X | D | D | D | D | D | X | X |
| 48 | D | D | X | X | X | X | X | D | X | X | X | X | X | X |
| 49 | D | X | X | X | X | X | X | D | X | X | X | X | X | X |
| 50 | X | U | U | U | U | U | X | U | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |

TABLE 11-continued

| Format | \multicolumn{14}{c}{Symbol Number in Slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |

<Maximum output power> Power class 1, 2, 3, and 4 are specified based on UE types as follows:

TABLE 12

| UE Power class | UE type |
|---|---|
| 1 | Fixed wireless access (FWA) UE |
| 2 | Vehicular UE |
| 3 | Handheld UE |
| 4 | High power non-handheld UE |

1. UE maximum output power for power class 1 The following requirements define the maximum output power radiated by the UE for any transmission bandwidth within the channel bandwidth for non-CA configuration, unless otherwise stated. The period of measurement shall be at least one sub frame (1 ms). The requirement is verified with the test metric of effective isotropic radiated power (EIRP) (Link=Beam peak search grids, Meas=Link angle).

Below table shows UE minimum peak EIRP for power class 1.

TABLE 13

| Operating band | Min peak EIRP (dBm) |
|---|---|
| n257 | 40.0 |
| n258 | 40.0 |
| n260 | 38.0 |
| n261 | 40.0 |

The maximum output power values for total radiated power (TRP) and EIRP are found in below table. The maximum allowed EIRP is derived from regulatory requirements. The requirements are verified with the test metrics of TRP (Link=TX beam peak direction) in beam locked mode and EIRP (Link=TX beam peak direction, Meas=Link angle). Below table shows UE maximum output power limits for power class 1.

TABLE 14

| Operating band | Max TRP (dBm) | Max EIRP (dBm) |
|---|---|---|
| n257 | 35 | 55 |
| n258 | 35 | 55 |
| n260 | 35 | 55 |
| n261 | 35 | 55 |

The minimum EIRP at the 85th percentile of the distribution of radiated power measured over the full sphere around the UE is defined as the spherical coverage requirement and is found in below table. The requirement is verified with the test metric of EIRP (Link=Beam peak search grids, Meas=Link angle). Below table shows UE spherical coverage for power class 1.

TABLE 15

| Operating band | Min EIRP at 85%-tile CDF (dBm) |
|---|---|
| n257 | 32.0 |
| n258 | 32.0 |
| n260 | 30.0 |
| n261 | 32.0 |

2. UE maximum output power for power class 2 The following requirements define the maximum output power radiated by the UE for any transmission bandwidth within the channel bandwidth for non-CA configuration, unless otherwise stated. The period of measurement shall be at least one sub frame (1 ms). The requirement is verified with the test metric of EIRP (Link=Beam peak search grids, Meas=Link angle).

Below table shows UE minimum peak EIRP for power class 2.

TABLE 16

| Operating band | Min peak EIRP (dBm) |
|---|---|
| n257 | 29 |
| n258 | 29 |
| n261 | 29 |

The maximum output power values for TRP and EIRP are found in below table. The maximum allowed EIRP is derived from regulatory requirements [8]. The requirements are verified with the test metrics of TRP (Link=TX beam peak direction) in beam locked mode and EIRP (Link=TX beam peak direction, Meas=Link angle). Below table shows UE maximum output power limits for power class 2.

TABLE 17

| Operating band | Max TRP (dBm) | Max EIRP (dBm) |
|---|---|---|
| n257 | 23 | 43 |
| n258 | 23 | 43 |
| n261 | 23 | 43 |

The minimum EIRP at the 60th percentile of the distribution of radiated power measured over the full sphere around the UE is defined as the spherical coverage requirement and is found in below table. The requirement is verified with the test metric of EIRP (Link=Beam peak search grids, Meas=Link angle). Below table shows UE spherical coverage for power class 2.

TABLE 18

| Operating band | Min EIRP at 60%-tile CDF (dBm) |
| --- | --- |
| n257 | 18.0 |
| n258 | 18.0 |
| n261 | 18.0 |

3. UE maximum output power for power class 3 The following requirements define the maximum output power radiated by the UE for any transmission bandwidth within the channel bandwidth for non-CA configuration, unless otherwise stated. The period of measurement shall be at least one sub frame (1 ms). The requirement is verified with the test metric of total component of EIRP (Link=Beam peak search grids, Meas=Link angle). The requirement for the UE which supports a single FR2 band is specified in below table. The requirement for the UE which supports multiple FR2 bands is specified in both below tables.

Below table shows UE minimum peak EIRP for power class 3.

TABLE 19

| Operating band | Min peak EIRP (dBm) |
| --- | --- |
| n257 | 22.4 |
| n258 | 22.4 |
| n259 | 18.7 |
| n260 | 20.6 |
| n261 | 22.4 |

The maximum output power values for TRP and EIRP are found on the below table. The max allowed EIRP is derived from regulatory requirements [8]. The requirements are verified with the test metrics of TRP (Link=TX beam peak direction) in beam locked mode and the total component of EIRP (Link=TX beam peak direction, Meas=Link angle). Below table shows UE maximum output power limits for power class 3

TABLE 20

| Operating band | Max TRP (dBm) | Max EIRP (dBm) |
| --- | --- | --- |
| n257 | 23 | 43 |
| n258 | 23 | 43 |
| n259 | 23 | 43 |
| n260 | 23 | 43 |
| n261 | 23 | 43 |

The minimum EIRP at the 50th percentile of the distribution of radiated power measured over the full sphere around the UE is defined as the spherical coverage requirement and is found in below table. The requirement is verified with the test metric of the total component of EIRP (Link=Beam peak search grids, Meas=Link angle). The requirement for the UE which supports a single FR2 band is specified in the below table. The requirement for the UE which supports multiple FR2 bands is specified in both below tables. Below table shows UE spherical coverage for power class 3.

TABLE 21

| Operating band | Min EIRP at 50%-tile CDF (dBm) |
| --- | --- |
| n257 | 11.5 |
| n258 | 11.5 |
| n259 | 5.8 |

TABLE 21-continued

| Operating band | Min EIRP at 50%-tile CDF (dBm) |
| --- | --- |
| n260 | 8 |
| n261 | 11.5 |

For the UEs that support multiple FR2 bands, minimum requirement for peak EIRP and EIRP spherical coverage in above tables shall be decreased per band, respectively, by the peak EIRP relaxation parameter $\Delta MB_{P,n}$ and EIRP spherical coverage relaxation parameter $\Delta MB_{S,n}$. For each combination of supported bands $\Sigma MB_{P,n}$ and $\Delta MB_{S,n}$ apply to each supported band n, such that the total relaxations, $\Sigma MB_P$ and $\Sigma MB_S$, across all supported bands shall not exceed the total value indicated in the below table.

Below table shows UE multi-band relaxation factors for power class 3.

TABLE 22

| Supported bands | $\Sigma MBP$ (dB) | $\Sigma MBS$ (dB) |
| --- | --- | --- |
| n257, n258 | ≤1.3 | ≤1.25 |
| n257, n260 | ≤1.0 | ≤0.753 |
| n258, n260 | | |
| n257, n261 | 0.0 | 0.0 |
| n258, n261 | ≤1.0 | ≤1.25 |
| n260, n261 | 0.0 | ≤0.752 |
| n257, n258, n260 | ≤1.7 | ≤1.753 |
| n257, n258, n261 | | |
| n257, n258, n260, n261 | | |
| n257, n260, n261 | ≤0.5 | ≤1.253 |
| n258, n260, n261 | ≤1.5 | ≤1.253 |

4. UE Maximum Output Power for Power Class 4

The following requirements define the maximum output power radiated by the UE for any transmission bandwidth within the channel bandwidth for non-CA configuration, unless otherwise stated. The period of measurement shall be at least one sub frame (1 ms). The requirement is verified with the test metric of EIRP (Link=Beam peak search grids, Meas=Link angle).

Below table shows UE minimum peak EIRP for power class 4.

TABLE 23

| Operating band | Min peak EIRP (dBm) |
| --- | --- |
| n257 | 34 |
| n258 | 34 |
| n260 | 31 |
| n261 | 34 |

The maximum output power values for TRP and EIRP are found in the below table. The maximum allowed EIRP is derived from regulatory requirements [8]. The requirements are verified with the test metrics of TRP (Link=TX beam peak direction) in beam locked mode and EIRP (Link=TX beam peak direction, Meas=Link angle). Below table shows UE maximum output power limits for power class 4.

TABLE 24

| Operating band | Max TRP (dBm) | Max EIRP (dBm) |
| --- | --- | --- |
| n257 | 23 | 43 |
| n258 | 23 | 43 |

TABLE 24-continued

| Operating band | Max TRP (dBm) | Max EIRP (dBm) |
|---|---|---|
| n260 | 23 | 43 |
| n261 | 23 | 43 |

The minimum EIRP at the 20th percentile of the distribution of radiated power measured over the full sphere around the UE is defined as the spherical coverage requirement and is found in the below table. The requirement is verified with the test metric of EIRP (Link=Beam peak search grids, Meas=Link angle). Below table shows UE spherical coverage for power class 4.

TABLE 25

| Operating band | Min EIRP at 20%-tile CDF (dBm) |
|---|---|
| n257 | 25 |
| n258 | 25 |
| n260 | 19 |
| n261 | 25 |

<Types of CA> On the other hand, carrier aggregation can also be classified into inter-band CA and intra-band CA. The inter-band CA is a method of aggregating and using each CC existing in different operating bands, and the intra-band CA is a method of aggregating and using each CC in the same operating band. In addition, the CA technology is more specifically, intra-band contiguous CA, intra-band non-contiguous CA and inter-band discontinuity. Non-Contiguous) CA.

Figure 5A:
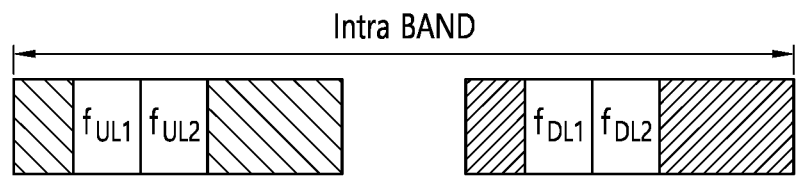
FIG. 5A illustrates a concept view of an example of intra-band contiguous CA.

FIG. 5a illustrates a concept view of an example of intra-band contiguous CA.

Figure 5B:
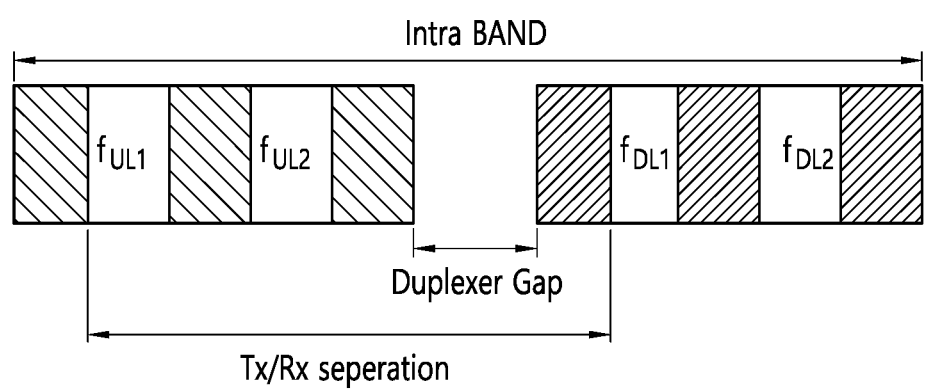
FIG. 5B illustrates a concept view of an example of intra-band non-contiguous CA.

FIG. 5b illustrates a concept view of an example of intra-band non-contiguous CA.

The CA may be split into the intra-band contiguous CA shown in FIG. 5a and the intra-band non-contiguous CA shown in FIG. 5b.

Figure 6A:
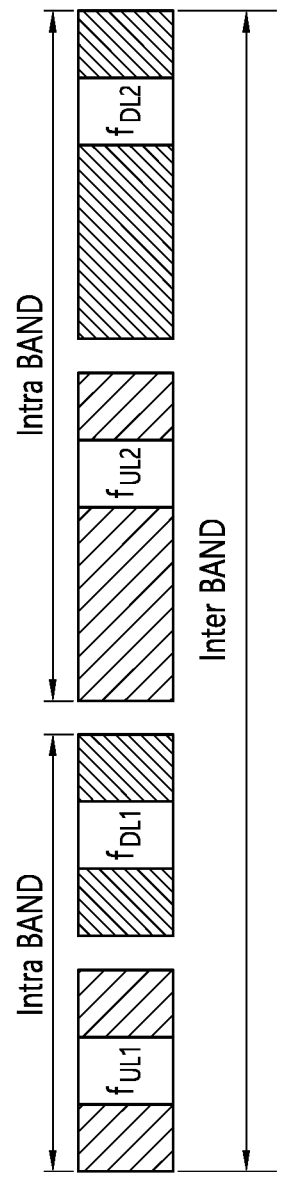
FIG. 6A illustrates a concept view of an example of a combination of a lower frequency band and a higher frequency band for inter-band CA.

FIG. 6a illustrates a concept view of an example of a combination of a lower frequency band and a higher frequency band for inter-band CA.

Figure 6B:
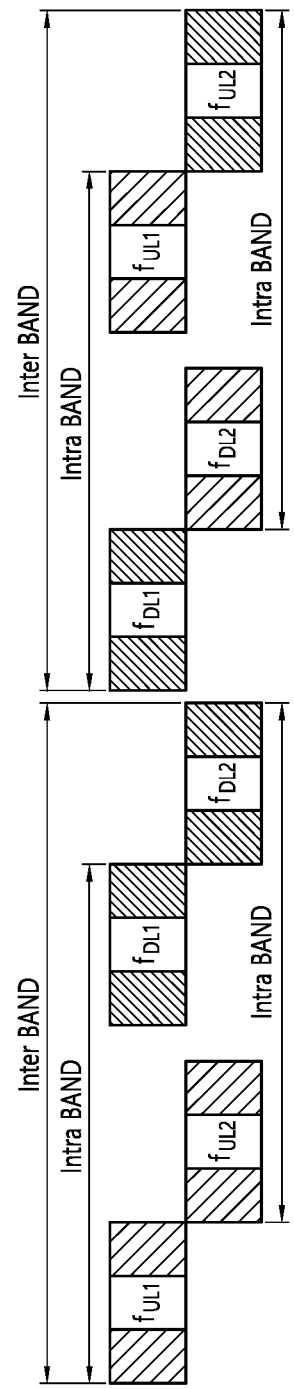
FIG. 6B illustrates a concept view of an example of a combination of similar frequency bands for inter-band CA.

FIG. 6b illustrates a concept view of an example of a combination of similar frequency bands for inter-band CA.

The inter-band carrier aggregation may be separated into inter-band CA between carriers of a low band and a high band having different RF characteristics of inter-band CA as shown in FIG. 6a and inter-band CA of similar frequencies that may use a common RF terminal per component carrier due to similar RF (radio frequency) characteristics as shown in FIG. 6b.

For inter-band carrier aggregation, a carrier aggregation configuration is a combination of operating bands, each supporting a carrier aggregation bandwidth class.

TABLE 26

| NR CA bandwidth class | Aggregated channel bandwidth | Number of contiguous CC |
|---|---|---|
| A | $BW_{Channel} \leq BW_{Channel,\ max}$ | 1 |
| B | $20\ MHz \leq BW_{Channel\_} \leq 100\ MHz$ | 2 |
| C | $100\ MHz < BW_{Channel\_CA} \leq 2 \times BW_{Channel,\ max}$ | 2 |
| D | $200\ MHz < BW_{Channel\_CA} \leq 3 \times BW_{Channel,\ max}$ | 3 |
| E | $300\ MHz < {}_{BWChannel\_CA} \leq 4 \times BW_{Channel,\ max}$ | 4 |
| G | $100\ MHz < BW_{Channel\_CA} \leq 150\ MHz$ | 3 |
| H | $150\ MHz < BW_{Channel\_CA} \leq 200\ MHz$ | 4 |
| I | $200\ MHz < BW_{Channel\_CA} \leq 250\ MHz$ | 5 |
| J | $250\ MHz < BW_{Channel\_CA} \leq 300\ MHz$ | 6 |
| K | $300\ MHz < BW_{Channel\_CA} \leq 350\ MHz$ | 7 |
| L | $350\ MHz < BW_{Channel\_CA} \leq 400\ MHz$ | 8 |

Figure 7:
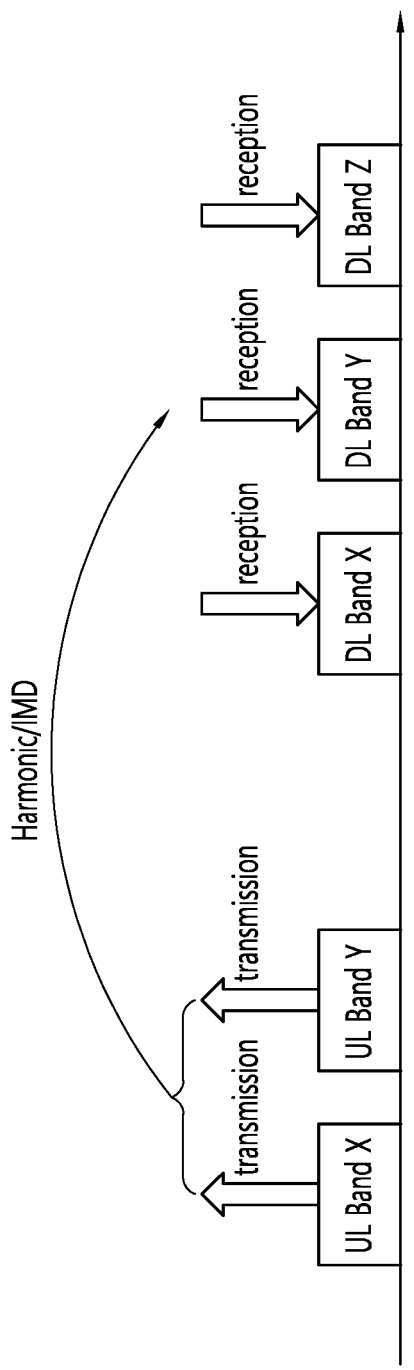
FIG. 7 illustrates an example of situation in which an uplink signal transmitted via an uplink operating band affects reception of a downlink signal on via downlink operating band.

FIG. 7 illustrates an example of situation in which an uplink signal transmitted via an uplink operating band affects reception of a downlink signal on via downlink operating band.

In FIG. 7, an Intermodulation Distortion (IMD) may mean amplitude modulation of signals containing two or more different frequencies, caused by nonlinearities or time variance in a system. The intermodulation between frequency components will form additional components at frequencies that are not just at harmonic frequencies (integer multiples) of either, like harmonic distortion, but also at the sum and difference frequencies of the original frequencies and at sums and differences of multiples of those frequencies.

Referring to FIG. 7, an example in which a CA is configured in a terminal is shown. For example, the terminal may perform communication through the CA based on three downlink operating bands (DL Band X, Y, Z) and two uplink operating bands (DL Band X, Y).

As shown in FIG. 7, in a situation in which three downlink operating bands are configured by the CA and two uplink operating bands are configured, the terminal may transmit an uplink signal through two uplink operating bands. In this case, a harmonics component and an intermodulation distortion (IMD) component occurring based on the frequency band of the uplink signal may fall into its own downlink band. That is, in the example of FIG. 7, when the terminal transmits the uplink signal, the harmonics component and the intermodulation distortion (IMD) component may occur, which may affect the downlink band of the terminal itself.

The terminal should be configured to satisfy a reference sensitivity power level (REFSENS) which is the minimum average power for each antenna port of the terminal when receiving the downlink signal.

When the harmonics component and/or IMD component occur as shown in the example of FIG. 7, there is a possibility that the REFSENS for the downlink signal may not be satisfied due to the uplink signal transmitted by the UE itself.

For example, the REFSENS may be set such that the downlink signal throughput of the terminal is 95% or more of the maximum throughput of the reference measurement channel. When the harmonics component and/or IMD component occur, there is a possibility that the downlink signal throughput is reduced to 95% or less of the maximum throughput.

<Disclosure of the Present Disclosure>

Therefore, it is determined whether the harmonics component and the IMD component of the terminal occur, and when the harmonics component and/or IMD component occur, the maximum sensitivity degradation (MSD) value is defined for the corresponding frequency band, so relaxation for REFSENS in the reception band may be allowed in the reception band due to its own transmission signal. Here, the MSD may mean the maximum allowed reduction of the REFSENS. When the MSD is defined for a specific operating band of the terminal where the CA or DC is configured, the REFSENS of the corresponding operating band may be relaxed by the amount of the defined MSD.

The disclosure of the present specification provides results of analysis about self-interference in a terminal configured with NR EN-DC and amount of relaxation to sensitivity.

The EN-DC may be a band combination of LTE (xDL/1UL) band and an inter/intra-NR (2DL/1UL) band.

I. Summary of Self-Interference Analysis

Below table summarizes the EN-DC band combinations with self-interference problems for 3DL/2UL EN-DC operation.

Below table shows summary of Self-interference analysis for LTE 1 band & NR 2 bands DL and 2 bands UL EN-DC operation.

TABLE 27

| EN-DC Downlink band configuration | Uplink EN-DC Configuration | Harmonic relation issues | intermodulation to own rx band ($3^{rd}$ band) | interference due to small frequency separation | MSD |
|---|---|---|---|---|---|
| DC__39_n41-n79 | DC__39A_n41A | $2^{nd}$ harmonic from n41 into n79 | $2^{nd}$ & $5^{th}$ IMDs | — | Over 4992 MHz frequency in n79 was impacted by $2^{nd}$ harmonic, but not used FFS |
|  | DC__39A_n79A | — | $2^{nd}$ & $5^{th}$ IMDs | — | FFS |
| DC__40_n41-n79 | DC__40A_n41A | $2^{nd}$ harmonic from n40 into n79 $2^{nd}$ harmonic from n41 into n79 | $2^{nd}$ & $4^{th}$ IMDs | — | FFS by $2^{nd}$ harmonic from B40 Over 4992 MHz frequency in n79 was impacted by $2^{nd}$ harmonic, but not used FFS No impact to china band since over 4800 MHz is considered in NR |
| DC__12_n7-n78 | DC__12A_n7A | $5^{th}$ harmonic from B12 into n78 | $4^{th}$ IMD |  | $5^{th}$ harmonic issue will be covered in DC__12A_n78A FFS |
|  | DC__12A_n78A | — | $2^{nd}$ IMD | Yes | FFS The cross band isolation issue already covered in Table 7.3B.2.3.4-1 |
| DC__2_n66-n78 | DC__2A_n66A | 2nd harmonic from B2 into n78 2nd harmonic from n66 inton78 | 2nd & 4th IMDs | — | These harmonic problems already specified in Table 7.3B.2.3.1-1 in TS38.101-3 FFS |
| DC__12_n66-n78 | DC__12A_n66A | 2nd harmonic from n66 inton78 5th harmonic from B12 into n78 | 5th IMD |  | 2nd harmonic is same as DC__66A_n78A and 5th harmonic will be covered in DC__12A_n78A FFS |
|  | DC__12A_n78A | 3rd harmonic from B12 into n66 | 3rd IMD |  | The harmonic problem already specified in Table 7.3B.2.3.1-1 in TS38.101-3 FFS |
| DC__7_n66-n78 | DC__7A_n66A | 2nd harmonic from n66 into n78 | 3rd IMD |  | Harmonic problem already covered in DC__66A_n78A FFS |
| DC__66_n66-n78 | DC__66A_n66A | 2nd harmonic from B66 into n78 | 2nd & 4th IMDs |  | Harmonic problem already covered in DC__66A_n78A-FFS |

TABLE 27-continued

| EN-DC Downlink band configuration | Uplink EN-DC Configuration | Harmonic relation issues | intermodulation to own rx band (3rd band) | interference due to small frequency separation | MSD |
|---|---|---|---|---|---|
| DC_20_n1-n28 | DC_20A_n28A | 3rd harmonic from n28 into n1 | 5th IMD | — | Harmonic problem already covered in DC_1A_n28A FFS |
| DC_20_n7-n28 | DC_20A_n7A | — | 3rd & 5th IMDs | — | FFS |
| DC_20_n7-n78 | DC_20A_n7A | 4th harmonic from B20 into n78 | 2nd & 4th IMDs | — | The harmonic problem already specified in Table 7.3B.2.3.1-1 in TS38.101-3- FFS |
| DC_3_n7-n28 | DC_3A_n7A, DC_3C_n7A | | 2nd IMD | — | FFS |
| DC_2_n41-n71 | DC_2A_n41A | — | 2nd & 5th IMDs | — | FFS |
| | DC_2A_n71A | 4th harmonic from n71 into n41 | 2nd IMD | — | The harmonic problem will be treated CA_n41A_n71A FFS |
| DC_18_n3-n78 | DC_18A_n3A | 2nd harmonic from n3 into n78 4th harmonic from B18 into n78 | 3rd & 5th IMDs | — | These harmonic problem already specified in in Table 7.3B.2.3.1-1 in TS38.101-3 FFS |
| DC_8_n1-n78 | DC_8A_n1A | 4th harmonic from B8 into n78 | 3rd IMD | — | The harmonic problem already specified in in Table 7.3B.2.3.1-1 in TS38.101-3- FFS |
| DC_3_n40-n79 | DC_3A_n40A | 2nd harmonic from n40 into n79 | 5th IMD | — | The 2nd harmonic problem will be studied in CA_n40-n79. FFS |
| | DC_3A_n79A | — | 5th IMD | — | FFS |
| DC_3_n41-n79 | DC_3A_n41A | 2nd harmonic from n41 into n79 | 2nd & 5th IMDs | Yes | The 2nd harmonic problem will be studied in CA_n41-n79. FFS The cross band isolation issue already covered in Table 7.3B.2.3.4-1 |
| DC_8_n40-n79 | DC_8A_n40A | 2nd harmonic from n40 into n79 5th harmonic from B8 into n79 | 4th IMD | — | These harmonic problem will be treated lower order DC or CA band combos. FFS |
| | DC_8A_n79A | — | 4th IMD | — | FFS |
| DC_8_n41-n79 | DC_8A_n41A | 2nd harmonic from n41 into n79 5th harmonic from B8 into n79 | 3rd IMD | — | These harmonic problem will be treated lower order DC or CA band combos. FFS |
| | DC_8A_n79A | 3rd harmonic from B8 into n41 | 3rd IMD | — | FFS |
| DC_39_n40-n79 | DC_39A_n40A | 2nd harmonic from n40 into n79 | 4th IMD | — | The harmonic problem will be treated CA_n40-n79 band combos. FFS |

TABLE 27-continued

| EN-DC Downlink band configuration | Uplink EN-DC Configuration | Harmonic relation issues | intermodulation to own rx band (3rd band) | interference due to small frequency separation | MSD |
|---|---|---|---|---|---|
| DC_8_n3-n28 | DC_8A_n3A | — | 2nd & 5th IMDs | — | FFS |
| DC7-7_n66-n78 | DC_7A_n66A | 2nd harmonic from n66 into n78 | 3rd IMD | — | The harmonic problem already covered in Table 7.3B.2.3.1-1 in TS38.101-3 - FFS |

The reference sensitivity requirement is relaxed by an amount of the Maximum Sensitivity Degradation (MSD).

Based on the above table, the present disclosure provides MSD analysis results to support EN-DC operation by dual transmission. MSD analysis for EN-DC LTE (x bands/1UL, x=1, 2, 3, 4)+NR (2 bands/1UL) band combinations It may be considered to use shared antenna RF architectures for NSA UE in sub-6 GHz as LTE system. Also, it may be considered to use shared antenna RF architecture for general NSA DC UE to derive MSD levels.

For the MSD analysis of these 3DL/2UL EN-DC NR UE, it is assumed that the parameters and attenuation levels based on current UE RF FE components as shown in below tables.

Below table shows the RF component isolation parameters (e.g., UE RF Front-end component parameters) to derive MSD level at sub-6 GHz.

TABLE 29

| Isolation Parameter | Value (dB) | Comment |
|---|---|---|
| Antenna to Antenna | 10 | Main antenna to diversity antenna |
| PA (out) to PA (in) | 60 | PCB isolation (PA forward mixing) |
| Triplexer | 20 | High/low band isolation |
| Diplexer | 25 | High/low band isolation |
| PA (out) to PA (out) | 60 | L-H/H-L cross-band |
| PA (out) to PA (out) | 50 | H-H cross-band |
| LNA (in) to PA (out) | 60 | L-H/H-L cross-band |
| LNA (in) to PA (out) | 50 | H-H cross-band |
| Duplexer | 50 | Tx band rejection at Rx band |

TABLE 28

| | Triplexer-Diplexer Architecture w/single ant. | | | | Cascaded Diplexer Architecture w/single ant. | | | |
|---|---|---|---|---|---|---|---|---|
| UE ref. architecture Component | DC_39A_n41A-n79A, DC_40A_n41A_n79A, DC_12A_n7A-n78A, DC_2A_n66A-n78A DC_12A_n66A-n78A, DC_7A_n66A-n78A DC_66A_n66A-n78A, DC_20A_n7A-n78A DC_18A_n3A-n78A, DC_28A_n3A-n78A DC_8A_n1A-n78A, DC_3A_n40A-n79A DC_3A_n41A-n79A, DC_8A_n40A-n79A DC_8A_n41A-n79A, DC_39A_n40-n79A DC_7A-7A_n66A-n78A | | | | DC_20A_n1A-n28A DC_20A_n7A-n28A DC_3A_n7A-n28A DC_2A_n41A-n71A DC_8A_n3A-n28A | | | |
| | IP2 (dBm) | IP3 (dBm) | IP4 (dBm) | IP5 (dBm) | IP2 (dBm) | IP3 (dBm) | IP4 (dBm) | IP5 (dBm) |
| Ant. Switch | 112 | 68 | 55 | 55 | 112 | 68 | 55 | 55 |
| Triplexer | 110 | 72 | 55 | 52 | | | | |
| Quadplexer | | | | | 112 | 72 | 55 | 52 |
| Diplexer | 115 | 87 | 55 | 55 | 115 | 87 | 55 | 55 |
| Duplexer | 100 | 75 | 55 | 53 | 100 | 75 | 55 | 53 |
| PA Forward | 28.0 | 32 | 30 | 28 | 28.0 | 32 | 30 | 28 |
| PA Reversed | 40 | 30.5 | 30 | 30 | 40 | 30.5 | 30 | 30 |
| LNA | 10 | 0 | 0 | −10 | 10 | 0 | 0 | −10 |

Below table shows the isolation levels according to the RF component (e.g., UE RF Front-end component isolation parameters).

Based on these assumptions, the present disclosure proposes the MSD levels as below table shows a proposed MSD test configuration and results by IMD problems

TABLE 30

| DC bands | UL DC | IMD | | UL Fc (MHz) | UL BW (MHz) | UL RB # | DL Fc (MHz) | DL BW (MHz) | MSD (dB) |
|---|---|---|---|---|---|---|---|---|---|
| DC_39A_n41A-n79A | 39 | IMD | $|f_{B39} - f_{n41}|$ | 1900 | 5 | 25 | 1900 | 5 | N/A |
| | n41 | 2 | | 2620 | 10 | 50 | 2620 | 10 | |
| | n79 | | | 4520 | 40 | 216 | 4520 | 40 | 29.8 |
| | 39 | IMD | $|4*f_{B39} - f_{n41}|$ | 1885 | 5 | 25 | 1885 | 5 | N/A |
| | n41 | 5 | | 2660 | 10 | 50 | 2660 | 10 | |
| | n79 | | | 4880 | 40 | 216 | 4880 | 40 | 4.4 |
| | 39 | IMD | $|f_{B39} - f_{n79}|$ | 1900 | 5 | 25 | 1900 | 5 | N/A |
| | n79 | 2 | | 4520 | 40 | 216 | 4520 | 40 | |
| | n41 | | | 2620 | 10 | 50 | 2620 | 10 | 30.2 |
| | 39 | IMD | $|4*f_{B39} - f_{n79}|$ | 1885 | 5 | 25 | 1885 | 5 | N/A |
| | n79 | 5 | | 4880 | 40 | 216 | 4880 | 40 | |
| | n41 | | | 2660 | 10 | 50 | 2660 | 10 | 4.3 |
| DC_40A_n41A-n79A | 40 | IMD | $|f_{B40} + f_{n41}|$ | 2340 | 5 | 25 | 2340 | 5 | N/A |
| | n41 | 2 | | 2600 | 10 | 50 | 2600 | 10 | |
| | n79 | | | 4940 | 40 | 216 | 4940 | 10 | 30.5 |
| DC_12A_n7A-n78A | 12 | IMD | $|2*f_{B12} - 2*f_{n7}|$ | 708 | 5 | 25 | 738 | 5 | N/A |
| | n7 | 4 | | 2520 | 5 | 25 | 2640 | 5 | |
| | n78 | | | 3624 | 10 | 50 | 3624 | 10 | 8.4 |
| | 12 | IMD | $|f_{B12} - f_{n78}|$ | 708 | 5 | 25 | 738 | 5 | N/A |
| | n78 | 2 | | 3360 | 10 | 50 | 3360 | 10 | |
| | n7 | | | 2542 | 5 | 25 | 2662 | 5 | 28.7 |
| DC_2A_n66A-n78A | 2 | IMD | $|f_{B2} + f_{n66}|$ | 1880 | 5 | 25 | 1960 | 5 | N/A |
| | n66 | 2 | | 1740 | 5 | 25 | 2140 | 5 | |
| | n78 | | | 3620 | 10 | 50 | 3620 | 10 | 29.4 |
| | 2 | IMD | $|f_{B2} - 3*f_{n66}|$ | 1880 | 5 | 25 | 1960 | 5 | N/A |
| | n66 | 4 | | 1740 | 5 | 25 | 2140 | 5 | |
| | n78 | | | 3340 | 10 | 50 | 3340 | 10 | 8.9 |
| DC_12A_n66A-n78A | 12 | IMD | $|2*f_{B12} - 3*f_{n66}|$ | 703 | 5 | 25 | 733 | 5 | N/A |
| | n66 | 5 | | 1720 | 5 | 25 | 2120 | 5 | |
| | n78 | | | 3754 | 10 | 50 | 3754 | 10 | 4.1 |
| | 12 | IMD | $|2*f_{B12} - f_{n78}|$ | 703 | 5 | 25 | 733 | 5 | N/A |
| | n78 | 3 | | 3546 | 10 | 50 | 3546 | 10 | |
| | n66 | | | 1740 | 5 | 25 | 2140 | 5 | 16.5 |
| DC_7A_n66A-n78A | 7 | IMD | $|2*f_{B7} - f_{n66}|$ | 2542 | 5 | 25 | 2662 | 5 | N/A |
| | n66 | 3 | | 1740 | 5 | 25 | 2140 | 5 | |
| | n78 | | | 3344 | 10 | 50 | 3344 | 10 | 16.0 |
| DC_66A_n66A-n78A | 66 | IMD | $|f_{B66} + f_{n66}|$ | TBD | 5 | 25 | TBD | 5 | N/A |
| | n66 | 2 | | TBD | 5 | 25 | TBD | 5 | |
| | n78 | | | TBD | 10 | 50 | TBD | 10 | TBD |
| | 66 | IMD | $|3*f_{B66} - f_{n66}|$ | TBD | 5 | 25 | TBD | 5 | N/A |
| | n66 | 4 | | TBD | 5 | 25 | TBD | 5 | |
| | n78 | | | TBD | 10 | 50 | TBD | 10 | TBD |
| DC_20A_n1A-n28A | 20 | IMD | $|f_{B20} - 4*f_{n28}|$ | 837 | 5 | 25 | 796 | 5 | N/A |
| | n28 | 5 | | 738 | 5 | 25 | 793 | 5 | |
| | n1 | | | 1925 | 5 | 25 | 2115 | 5 | 3.3 |
| DC_20A_n7A-n28A | 20 | IMD | $|2*f_{B20} - f_{n7}|$ | 857 | 5 | 25 | 816 | 5 | N/A |
| | n7 | 3 | | 2512 | 5 | 25 | 2632 | 5 | |
| | n28 | | | 743 | 5 | 25 | 798 | 5 | 15.7 |
| | 20 | IMD | $|4*f_{B20} - f_{n7}|$ | 837 | 5 | 25 | 796 | 5 | N/A |
| | n7 | 5 | | 2555 | 5 | 25 | 2675 | 5 | |
| | n28 | | | 738 | 5 | 25 | 793 | 5 | 2.8 |
| DC_20A_n7A-n78A | 20 | IMD | $|f_{B20} + f_{n7}|$ | 837 | 5 | 25 | 796 | 5 | N/A |
| | n7 | 2 | | 2555 | 5 | 25 | 2675 | 5 | |
| | n78 | | | 3392 | 10 | 50 | 3392 | 10 | 28.8 |
| | 20 | IMD | $|2*f_{B20} - 2*f_{n7}|$ | 837 | 5 | 25 | 796 | 5 | N/A |
| | n7 | 4 | | 2555 | 5 | 25 | 2675 | 5 | |
| | n78 | | | 3436 | 10 | 50 | 3436 | 10 | 8.5 |
| DC_3A_n7A-n28A | 3 | IMD | $|f_{B3} - f_{n7}|$ | 1730 | 5 | 25 | 1825 | 5 | N/A |
| | n7 | 2 | | 2518 | 5 | 25 | 2638 | 5 | |
| | n28 | | | 733 | 5 | 25 | 788 | 5 | 29.0 |
| DC_2A_n41A-n71A | 2 | IMD | $|f_{B2} - f_{n41}|$ | 1900 | 5 | 25 | 1980 | 5 | N/A |
| | n41 | 2 | | 2530 | 10 | 50 | 2530 | 10 | |
| | n71 | | | 676 | 5 | 50 | 630 | 5 | 28.7 |
| | 2 | IMD | $|3*f_{B2} - 2*f_{n41}|$ | 1900 | 5 | 25 | 1980 | 5 | N/A |
| | n41 | 5 | | 2530 | 10 | 50 | 2530 | 10 | |
| | n71 | | | 686 | 5 | 50 | 640 | 5 | 3.8 |
| | 2 | IMD | $|f_{B2} + f_{n71}|$ | 1900 | 5 | 25 | 1980 | 5 | N/A |
| | n71 | 2 | | 686 | 5 | 50 | 640 | 5 | |
| | n41 | | | 2586 | 10 | 50 | 2586 | 10 | 29.2 |
| DC_18A_n3A-n78A | 18 | IMD | $|2*f_{B18} + f_{n3}|$ | 820 | 5 | 25 | 865 | 5 | N/A |
| | n3 | 3 | | 1750 | 5 | 25 | 1845 | 5 | |
| | n78 | | | 3390 | 10 | 50 | 3390 | 10 | 15.2 |
| | 18 | IMD | $|2*f_{B18} - 3*f_{n3}|$ | 820 | 5 | 25 | 865 | 5 | N/A |
| | n3 | 5 | | 1750 | 5 | 25 | 1845 | 5 | |
| | n78 | | | 3610 | 10 | 50 | 3610 | 10 | 4.0 |

TABLE 30-continued

| DC bands | UL DC | | IMD | UL Fc (MHz) | UL BW (MHz) | UL RB # | DL Fc (MHz) | DL BW (MHz) | MSD (dB) |
|---|---|---|---|---|---|---|---|---|---|
| DC_8A_n1A-n78A | 8 | IMD 3 | $\|2*f_{B8} + f_{n1}\|$ | 900 | 5 | 25 | 945 | 5 | N/A |
| | n1 | | | 1945 | 5 | 25 | 2135 | 5 | |
| | n78 | | | 3745 | 10 | 50 | 3745 | 10 | 14.9 |
| DC_3A_n40A-n79A | 3 | IMD 5 | $\|4*f_{B3} - f_{n40}\|$ | 1720 | 5 | 25 | 1815 | 5 | N/A |
| | n40 | | | 2330 | 5 | 25 | 2330 | 5 | |
| | n79 | | | 4550 | 40 | 216 | 4550 | 40 | 4.7 |
| | 3 | IMD 5 | $\|4*f_{B3} - f_{n79}\|$ | 1720 | 5 | 25 | 1815 | 5 | N/A |
| | n79 | | | 4550 | 40 | 216 | 4550 | 40 | |
| | n40 | | | 2330 | 5 | 25 | 2330 | 5 | 3.2 |
| DC_3A_n41A-n79A | 3 | IMD 2 | $\|f_{B3} - f_{n41}\|$ | 1770 | 5 | 25 | 1865 | 5 | N/A |
| | n41 | | | 2670 | 10 | 50 | 2670 | 10 | |
| | n79 | | | 4440 | 40 | 216 | 4440 | 40 | 30.8 |
| | 3 | IMD 5 | $\|4*f_{B3} - f_{n41}\|$ | 1770 | 5 | 25 | 1865 | 5 | N/A |
| | n41 | | | 2550 | 10 | 50 | 2550 | 10 | |
| | n79 | | | 4530 | 40 | 216 | 4530 | 40 | 5.2 |
| DC_8A_n40A-n79A | 8 | IMD 4 | $\|3*f_{B8} + f_{n40}\|$ | 885 | 5 | 25 | 930 | 5 | N/A |
| | n40 | | | 2305 | 5 | 25 | 2305 | 5 | |
| | n79 | | | 4960 | 40 | 216 | 4960 | 40 | 10.7 |
| | 8 | IMD 4 | $\|3*f_{B8} - f_{n79}\|$ | 885 | 5 | 25 | 930 | 5 | N/A |
| | n79 | | | 4960 | 40 | 216 | 4960 | 40 | |
| | n40 | | | 2305 | 5 | 25 | 2305 | 5 | 9.2 |
| DC_8A_n41A-n79A | 8 | IMD 3 | $\|2*f_{B8} + f_{n41}\|$ | 910 | 5 | 25 | 955 | 5 | N/A |
| | n41 | | | 2650 | 10 | 50 | 2650 | 10 | |
| | n79 | | | 4470 | 40 | 216 | 4470 | 40 | 16.3 |
| | 8 | IMD 3 | $\|2*f_{B8} - f_{n79}\|$ | 910 | 5 | 25 | 955 | 5 | N/A |
| | n79 | | | 4470 | 40 | 216 | 4470 | 40 | |
| | n41 | | | 2650 | 10 | 50 | 2650 | 10 | 15.5 |
| DC_39A_n40A-n79A | 39 | IMD 4 | $\|f_{B39} - 3*f_{n40}\|$ | 1917.5 | 5 | 25 | 1917.5 | 5 | N/A |
| | n40 | | | 2302.5 | 5 | 25 | 2302.5 | 5 | |
| | n79 | | | 4980 | 40 | 216 | 4980 | 40 | 5.8 |
| DC_8A_n3A-n28A | 8 | IMD 2 | $\|f_{B8} - f_{n3}\|$ | 912.5 | 5 | 25 | 957.5 | 5 | N/A |
| | n3 | | | 1712.5 | 5 | 25 | 1807.5 | 5 | |
| | n28 | | | 745 | 5 | 25 | 800 | 5 | 30.4 |
| | 8 | IMD 5 | $\|3*f_{B8} - 2*f_{n3}\|$ | 910 | 5 | 25 | 955 | 5 | N/A |
| | n3 | | | 1750 | 5 | 25 | 1845 | 5 | |
| | n28 | | | 715 | 5 | 25 | 770 | 5 | 2.6 |
| DC_7A-7A_n66A-n78A | 7 | IMD 3 | $\|2*f_{B7} - f_{n66}\|$ | 2555 | 5 | 25 | 2675 | 5 | N/A |
| | n66 | | | 1740 | 5 | 25 | 2140 | 5 | |
| | n78 | | | 3370 | 10 | 50 | 3370 | 10 | 15.1 |

Accordingly, the present disclosure proposes the required MSD levels based on shared antenna RF architectures to support NSA DC operation in sub-6 GHz. Based on the analysis in session 2, we proposed as below Proposal: The proposed MSD test configuration and MSD levels should be considered to specify the MSD requirements in related TR and TS for EN-DC band combinations.

III. Proposals for MSD values by the analysis

III-1. Proposed MSD level for DC_40A_n41A-n79A

There is IMD2 products produced by Band 40 and n41 that impact the reference sensitivity of NR n79. The required MSD is shown in the following table.

Below table shows MSD exception for Scell due to dual uplink operation for EN-DC_40A_n41A-n79A.

TABLE 31

| DC bands | UL DC | | IMD | UL Fc (MHz) | UL BW (MHz) | UL RB # | DL Fc (MHz) | MSD (dB) |
|---|---|---|---|---|---|---|---|---|
| DC_40A_n41A-n79A | 40 | IMD 2 | $\|f_{B40} + f_{n41}\|$ | 2340 | 5 | 25 | 2340 | N/A |
| | n41 | | | 2600 | 10 | 50 | 2600 | |
| | n79 | | | 4940 | 40 | 216 | 4940 | 30.5 |

III-2. Proposed MSD level for DC_39A_n41A-n79

Figure 8A:
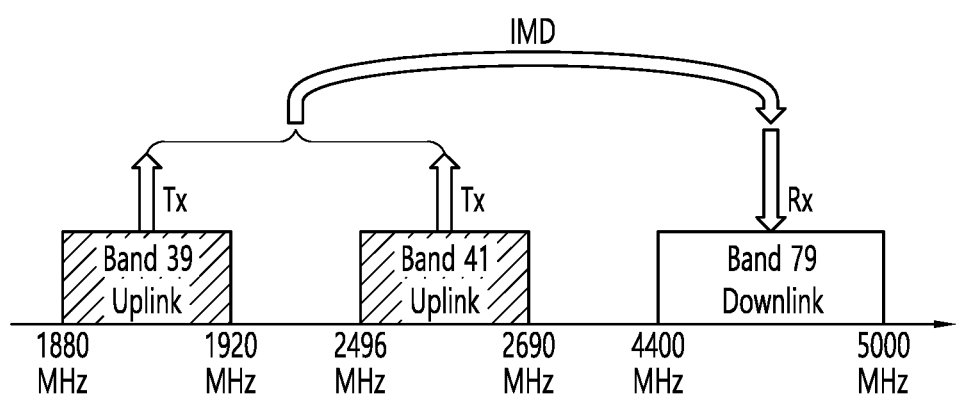
FIGS. 8A and 8B illustrate exemplary IMD by a combination of band 39, n41 and n79.
Figure 8B:
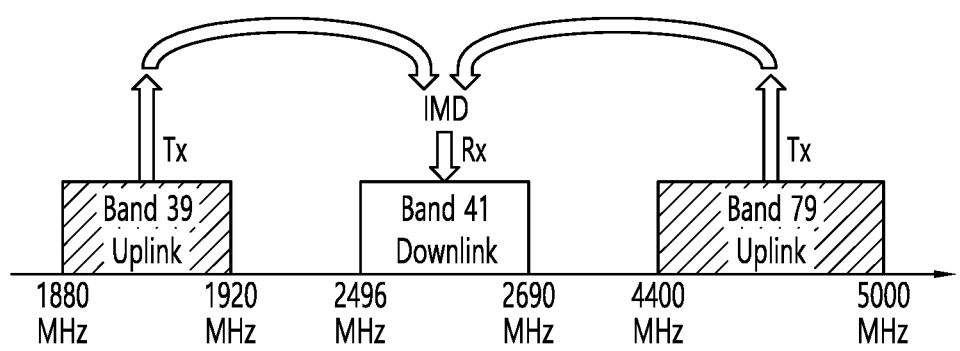

FIGS. 8a and 8b illustrate exemplary IMD by a combination of bands 39, n41 and n79.

There are IMD2 & IMD5 products produced by Band 39 and n41 that impact the reference sensitivity of NR n79. For example, as shown in FIG. 8a, if the UE transmits uplink signals via uplink bands of operating bands 39 and n41, IMD products are produced and then a reference sensitivity in operating band n79 is degraded. Therefore, a value of MSD is needed to apply the reference sensitivity.

In addition, there are IMD2 & IMD5 product produced by Band 39 and n79 that impact the reference sensitivity of NR Band n41. The required MSD are shown in the following table. For example, as shown in FIG. 8b, if the UE transmits uplink signals via uplink bands of operating bands 39 and n79, IMD products are produced and then a reference sensitivity in operating band n41 is degraded. Therefore, a value of MSD is needed to apply the reference sensitivity.

Below table shows MSD exception for Scell due to dual uplink operation for EN-DC_39A_n41A-n79A.

TABLE 32

| DC bands | UL DC | IMD | | UL Fc (MHz) | UL BW (MHz) | UL RB # | DL Fc (MHz) | MSD (dB) |
|---|---|---|---|---|---|---|---|---|
| DC__39A__n41A-n79A | 39 | IMD | $\|f_{B39} - f_{n41}\|$ | 1900 | 5 | 25 | 1900 | N/A |
| | n41 | 2 | | 2620 | 10 | 50 | 2620 | |
| | n79 | | | 4520 | 40 | 216 | 4520 | 29.8 |
| | 39 | IMD | $\|4*f_{B39} - f_{n41}\|$ | 1885 | 5 | 25 | 1885 | N/A |
| | n41 | 5 | | 2660 | 10 | 50 | 2660 | |
| | n79 | | | 4880 | 40 | 216 | 4880 | 4.4 |
| | 39 | IMD | $\|f_{B39} - f_{n79}\|$ | 1900 | 5 | 25 | 1900 | N/A |
| | n79 | 2 | | 4520 | 40 | 216 | 4520 | |
| | n41 | | | 2620 | 10 | 50 | 2620 | 30.2 |
| | 39 | IMD | $\|4*f_{B39} - f_{n79}\|$ | 1885 | 5 | 25 | 1885 | N/A |
| | n79 | 5 | | 4880 | 40 | 216 | 4880 | |
| | n41 | | | 2660 | 10 | 50 | 2660 | 4.3 |

III-3. Proposed MSD level for DC_12_n7-n78

There is IMD4 products produced by Band 12 and n7 that impact the reference sensitivity of NR band n78. The required MSD is shown in the following table.

In addition, there is IMD2 product produced by Band 12 and n78 that impact the reference sensitivity of NR Band n7. The required MSD is shown in the following table.

Below table shows a MSD exception for Scell due to dual uplink operation for EN-DC_12A_n7A-n78A.

TABLE 33

| DC bands | UL DC | IMD | | UL Fc (MHz) | UL BW (MHz) | UL RB # | DL Fc (MHz) | MSD (dB) |
|---|---|---|---|---|---|---|---|---|
| DC__12A__n7A-n78A | 12 | IMD | $\|2*f_{B12} - 2*f_{n7}\|$ | 708 | 5 | 25 | 738 | N/A |
| | n7 | 4 | | 2520 | 5 | 25 | 2640 | |
| | n78 | | | 3624 | 10 | 50 | 3624 | 8.4 |
| | 12 | IMD | $\|f_{B12} - f_{n78}\|$ | 708 | 5 | 25 | 738 | N/A |
| | n78 | 2 | | 3360 | 10 | 50 | 3360 | |
| | n7 | | | 2542 | 5 | 25 | 2662 | 28.7 |

III-4. Proposed MSD level for DC_2_n66-n78

Figure 9:
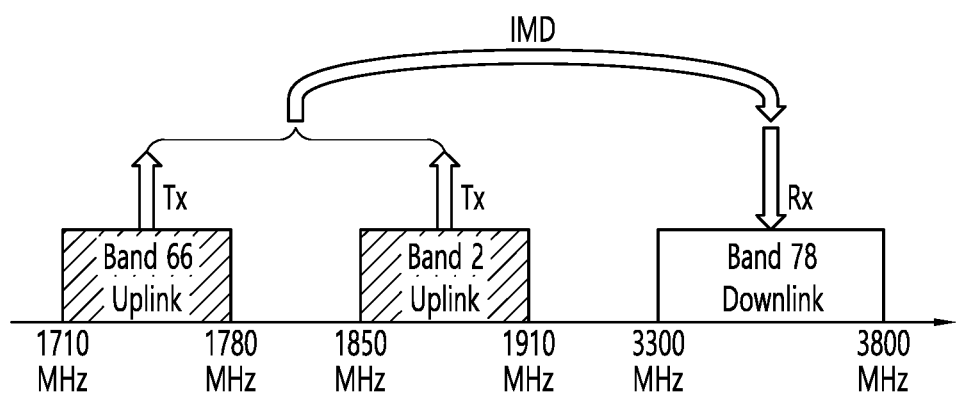
FIG. 9 illustrates exemplary IMD by a combination of bands 66, n2 and n78.

FIG. 9 illustrates exemplary IMD by a combination of bands 2, n66 and n78.

There are IMD2 & IMD4 products produced by Band 2 and n66 that impact the reference sensitivity of NR band n78. For example, as shown in FIG. 9, if the UE transmits uplink signals via uplink bands of operating bands 2 and n66, IMD products are produced and then a reference sensitivity in operating band n78 is degraded. Therefore, a value of MSD is needed to apply the reference sensitivity.

Below table shows a MSD exception for Scell due to dual uplink operation for EN-DC_2A_n66A-n78A.

III-5. Proposed MSD level for DC_12_n66-n78

There is IMD5 products produced by Band 12 and n66 that impact the reference sensitivity of NR band n78. The required MSD is shown in the following table.

In addition, there is IMD3 product produced by Band 12 and n78 that impact the reference sensitivity of NR Band n66. The required MSD is shown in the following table.

Below table shows a MSD exception for Scell due to dual uplink operation for EN-DC_12A_n66A-n78A.

TABLE 34

| DC bands | UL DC | IMD | | UL Fc (MHz) | UL BW (MHz) | UL RB # | DL Fc (MHz) | MSD (dB) |
|---|---|---|---|---|---|---|---|---|
| DC__2A__n66A-n78A | 2 | IMD | $\|f_{B2} + f_{n66}\|$ | 1880 | 5 | 25 | 1960 | N/A |
| | n66 | 2 | | 1740 | 5 | 25 | 2140 | |
| | n78 | | | 3620 | 10 | 50 | 3620 | 29.4 |
| | 2 | IMD | $\|f_{B2} - 3*f_{n66}\|$ | 1880 | 5 | 25 | 1960 | N/A |
| | n66 | 4 | | 1740 | 5 | 25 | 2140 | |
| | n78 | | | 3340 | 10 | 50 | 3340 | 8.9 |

TABLE 35

| DC bands | UL DC | | IMD | UL Fc (MHz) | UL BW (MHz) | UL RB # | DL Fc (MHz) | MSD (dB) |
|---|---|---|---|---|---|---|---|---|
| DC_12A__n66A-n78A | 12 | IMD 5 | $|2*f_{B12} - 3*f_{n66}|$ | 703 | 5 | 25 | 733 | N/A |
| | n66 | | | 1720 | 5 | 25 | 2120 | |
| | n78 | | | 3754 | 10 | 50 | 3754 | 4.1 |
| | 12 | IMD 3 | $|2*f_{B12} - f_{n78}|$ | 703 | 5 | 25 | 733 | N/A |
| | n78 | | | 3546 | 10 | 50 | 3546 | |
| | n66 | | | 1740 | 5 | 25 | 2140 | 16.5 |

III-6. Proposed MSD level for DC_7_n66-n78

Figure 10:
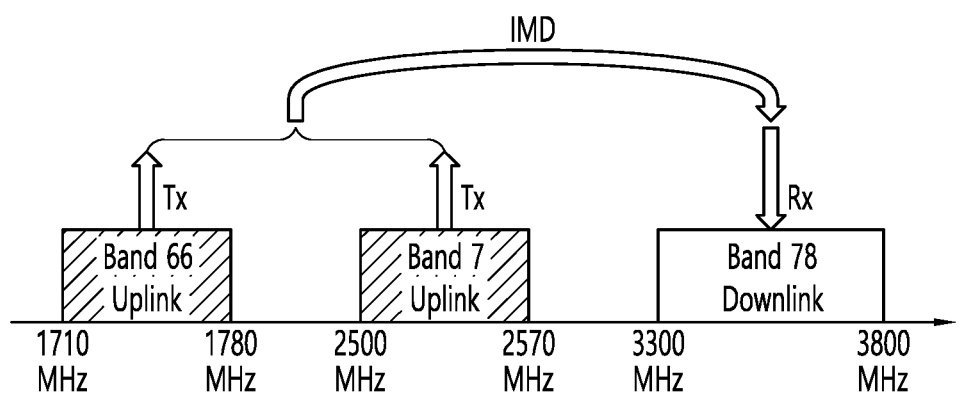
FIG. 10 illustrates exemplary IMD by a combination of bands 66, n7 and n78.

FIG. 10 illustrates exemplary IMD by a combination of bands 7, n66 and n78.

There is IMD3 products produced by Band 7 and n66 that impact the reference sensitivity of NR band n78. The required MSD is shown in the following table. For example, as shown in FIG. 10, if the UE transmits uplink signals via uplink bands of operating bands 7 and n66, IMD products are produced and then a reference sensitivity in operating band n78 is degraded. Therefore, a value of MSD is needed to apply the reference sensitivity.

Below table shows a MSD exception for Scell due to dual uplink operation for EN-DC_7_n66A-n78A.

TABLE 36

| DC bands | UL DC | | IMD | UL Fc (MHz) | UL BW (MHz) | UL RB # | DL Fc (MHz) | MSD (dB) |
|---|---|---|---|---|---|---|---|---|
| DC_7A__n66A-n78A | 7 | IMD 3 | $|2*f_{B7} - f_{n66}|$ | 2542 | 5 | 25 | 2662 | N/A |
| | n66 | | | 1740 | 5 | 25 | 2140 | |
| | n78 | | | 3344 | 10 | 50 | 3344 | 16.0 |

III-7. Proposed MSD level for DC_20_n1-n28

There is IMD5 products produced by Band 20 and n28 that impact the reference sensitivity of NR band n1. The required MSD is shown in the following table.

Below table shows a MSD exception for Scell due to dual uplink operation for EN-DC_20_n1A-n28A.

TABLE 37

| DC bands | UL DC | | IMD | UL Fc (MHz) | UL BW (MHz) | UL RB # | DL Fc (MHz) | MSD (dB) |
|---|---|---|---|---|---|---|---|---|
| DC_20A__n1A-n28A | 20 | IMD 5 | $|f_{B20} - 4*f_{n28}|$ | 837 | 5 | 25 | 796 | N/A |
| | n28 | | | 738 | 5 | 25 | 793 | |
| | n1 | | | 1925 | 5 | 25 | 2115 | 3.3 |

III-8. Proposed MSD level for DC_20_n7-n28

There are IMD3 & IMD5 products produced by Band 20 and n7 that impact the reference sensitivity of NR n28. The required MSD are shown in the following table.

Below table shows MSD exception for Scell due to dual uplink operation for EN-DC_20_n7A-n28A.

TABLE 38

| DC bands | UL DC | | IMD | UL Fc (MHz) | UL BW (MHz) | UL RB # | DL Fc (MHz) | MSD (dB) |
|---|---|---|---|---|---|---|---|---|
| DC_20A__n7A-n28A | 20 | IMD 3 | $|2*f_{B20} - f_{n7}|$ | 857 | 5 | 25 | 816 | N/A |
| | n7 | | | 2512 | 5 | 25 | 2632 | |
| | n28 | | | 743 | 5 | 25 | 798 | 15.7 |
| | 20 | IMD 5 | $|4*f_{B20} - f_{n7}|$ | 837 | 5 | 25 | 796 | N/A |
| | n7 | | | 2555 | 5 | 25 | 2675 | |
| | n28 | | | 738 | 5 | 25 | 793 | 2.8 |

III-9. Proposed MSD level for DC_20_n7-n78

There are IMD2 & IMD4 products produced by Band 20 and n7 that impact the reference sensitivity of NR n78. The required MSD are shown in the following table.

Below table shows MSD exception for Scell due to dual uplink operation for EN-DC_20_n7A-n78A.

TABLE 39

| DC bands | UL DC | IMD | | UL Fc (MHz) | UL BW (MHz) | UL RB # | DL Fc (MHz) | MSD (dB) |
|---|---|---|---|---|---|---|---|---|
| DC_20A_n7A-n78A | 20 | IMD 2 | $\|f_{B20} + f_{n7}\|$ | 837 | 5 | 25 | 796 | N/A |
| | n7 | | | 2555 | 5 | 25 | 2675 | |
| | n78 | | | 3392 | 10 | 50 | 3392 | 28.8 |
| | 20 | IMD 4 | $\|2*f_{B20} - 2*f_{n7}\|$ | 837 | 5 | 25 | 796 | N/A |
| | n7 | | | 2555 | 5 | 25 | 2675 | |
| | n78 | | | 3436 | 10 | 50 | 3436 | 8.5 |

III-10. Proposed MSD level for DC_3_n7-n28

There is IMD2 products produced by Band 3 and n7 that impact the reference sensitivity of NR n28. The required MSD is shown in the following table.

Below table shows MSD exception for Scell due to dual uplink operation for EN-DC_3_n7A-n28A.

TABLE 40

| DC bands | UL DC | IMD | | UL Fc (MHz) | UL BW (MHz) | UL RB # | DL Fc (MHz) | MSD (dB) |
|---|---|---|---|---|---|---|---|---|
| DC_3A_n7A-n28A | 3 | IMD 2 | $\|f_{B3} - f_{n7}\|$ | 1730 | 5 | 25 | 1825 | N/A |
| | n7 | | | 2518 | 5 | 25 | 2638 | |
| | n28 | | | 733 | 5 | 25 | 788 | 29.0 |

III-11. Proposed MSD level for DC_2_n41A-n71A

Figure 11A:
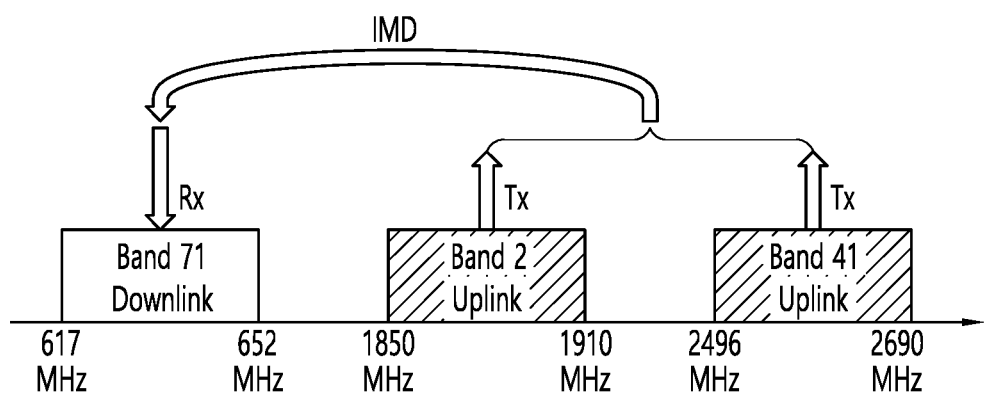
FIGS. 11A and 11B illustrate exemplary IMD by a combination of bands 71, n2 and n41.
Figure 11B:
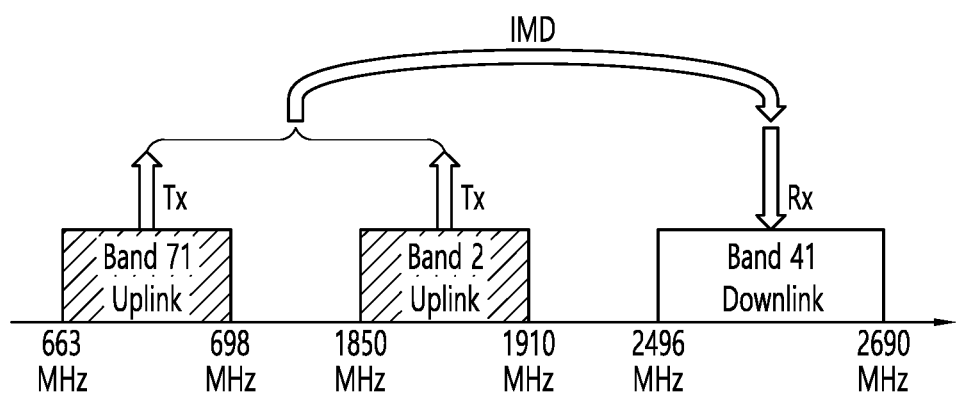

FIGS. 11a and 11b illustrate exemplary IMD by a combination of bands 2, n41 and n71.

TABLE 41

| DC bands | UL DC | IMD | | UL Fc (MHz) | UL BW (MHz) | UL RB # | DL Fc (MHz) | MSD (dB) |
|---|---|---|---|---|---|---|---|---|
| DC_2A_n41A-n71A | 2 | IMD 2 | $\|f_{B2} - f_{n41}\|$ | 1900 | 5 | 25 | 1980 | N/A |
| | n41 | | | 2530 | 10 | 50 | 2530 | |
| | n71 | | | 676 | 5 | 50 | 630 | 28.7 |
| | 2 | IMD 5 | $\|3*f_{B2} - 2*f_{n41}\|$ | 1900 | 5 | 25 | 1980 | N/A |
| | n41 | | | 2530 | 10 | 50 | 2530 | |
| | n71 | | | 686 | 5 | 50 | 640 | 3.8 |
| | 2 | IMD 2 | $\|f_{B2} + f_{n71}\|$ | 1900 | 5 | 25 | 1980 | N/A |
| | n71 | | | 686 | 5 | 50 | 640 | |
| | n41 | | | 2586 | 10 | 50 | 2586 | 29.2 |

There are IMD2 & IMD5 products produced by Band 2 and n41 that impact the reference sensitivity of NR n71. For example, as shown in FIG. 11a, if the UE transmits uplink signals via uplink bands of operating bands 2 and n41, IMD products are produced and then a reference sensitivity in operating band n71 is degraded. Therefore, a value of MSD is needed to apply the reference sensitivity.

In addition, there is IMD2 product produced by Band 2 and n71 that impact the reference sensitivity of NR Band n41. The required MSD are shown in the following table. For example, as shown in FIG. 11b, if the UE transmits uplink signals via uplink bands of operating bands 2 and n71, IMD products are produced and then a reference sensitivity in operating band n41 is degraded. Therefore, a value of MSD is needed to apply the reference sensitivity.

Below table shows MSD exception for Scell due to dual uplink operation for EN-DC_2A_n41A-n71A.

III-12. Proposed MSD level for DC_18_n3-n78

Figure 12:
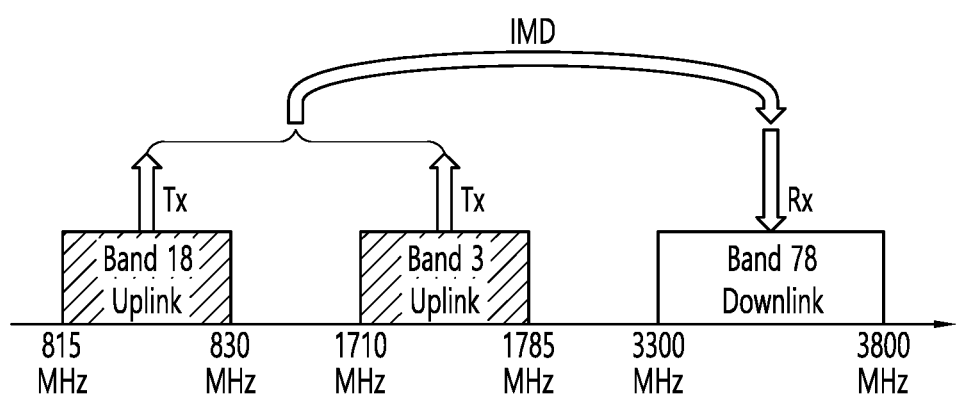
FIG. 12 illustrates exemplary IMD by a combination of bands 18, n3 and n78.

FIG. 12 illustrates exemplary IMD by a combination of bands 18, n3 and n78.

There are IMD3 & IMD5 products produced by Band 18 and n3 that impact the reference sensitivity of NR n78. The required MSD are shown in the following table. For example, as shown in FIG. 12, if the UE transmits uplink signals via uplink bands of operating bands 18 and n3, IMD products are produced and then a reference sensitivity in operating band n78 is degraded. Therefore, a value of MSD is needed to apply the reference sensitivity.

Below table shows MSD exception for Scell due to dual uplink operation for EN-DC_18_n3A-n78A.

TABLE 42

| DC bands | UL DC | IMD | | UL Fc (MHz) | UL BW (MHz) | UL RB # | DL Fc (MHz) | MSD (dB) |
|---|---|---|---|---|---|---|---|---|
| DC__18A__n3A-n78A | 18 | IMD 3 | $|2*f_{B18} + f_{n3}|$ | 820 | 5 | 25 | 865 | N/A |
| | n3 | | | 1750 | 5 | 25 | 1845 | |
| | n78 | | | 3390 | 10 | 50 | 3390 | 15.2 |
| | 18 | IMD 5 | $|2*f_{B18} - 3*f_{n3}|$ | 820 | 5 | 25 | 865 | N/A |
| | n3 | | | 1750 | 5 | 25 | 1845 | |
| | n78 | | | 3610 | 10 | 50 | 3610 | 4.0 |

III-13. Proposed MSD level for DC_8_n1-n78

Figure 13:
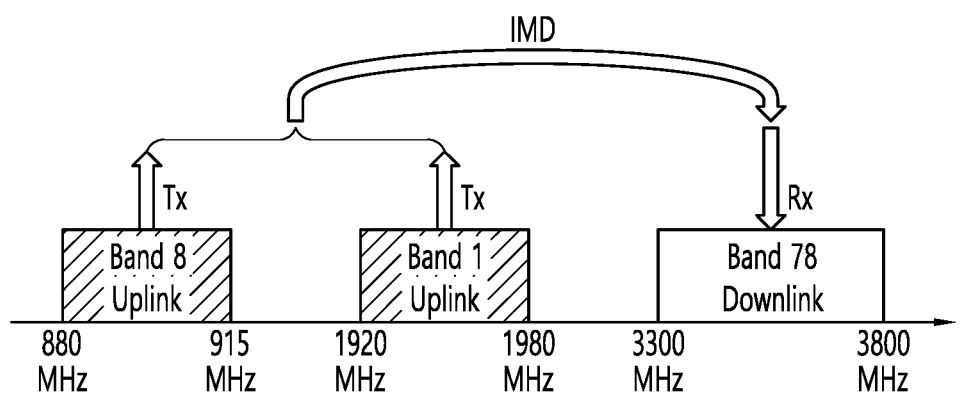
FIG. 13 illustrates exemplary IMD by a combination of bands 8, n1 and n78.

FIG. 13 illustrates exemplary IMD by a combination of bands 8, n1 and n78.

There is IMD3 products produced by Band 8 and n1 that impact the reference sensitivity of NR band n78. The required MSD is shown in the following table. For example, as shown in FIG. 13, if the UE transmits uplink signals via uplink bands of operating bands 8 and n1, IMD products are produced and then a reference sensitivity in operating band n78 is degraded. Therefore, a value of MSD is needed to apply the reference sensitivity.

Below table shows a MSD exception for Scell due to dual uplink operation for EN-DC_8_n1A-n78A.

TABLE 43

| DC bands | UL DC | IMD | | UL Fc (MHz) | UL BW (MHz) | UL RB # | DL Fc (MHz) | MSD (dB) |
|---|---|---|---|---|---|---|---|---|
| DC_8A__n1A-n78A | 8 | IMD 3 | $|2*f_{B8} + f_{n1}|$ | 900 | 5 | 25 | 945 | N/A |
| | n1 | | | 1945 | 5 | 25 | 2135 | |
| | n78 | | | 3745 | 10 | 50 | 3745 | 14.9 |

III-14. Proposed MSD level for DC_3_n40A-n79A

Figure 14A:
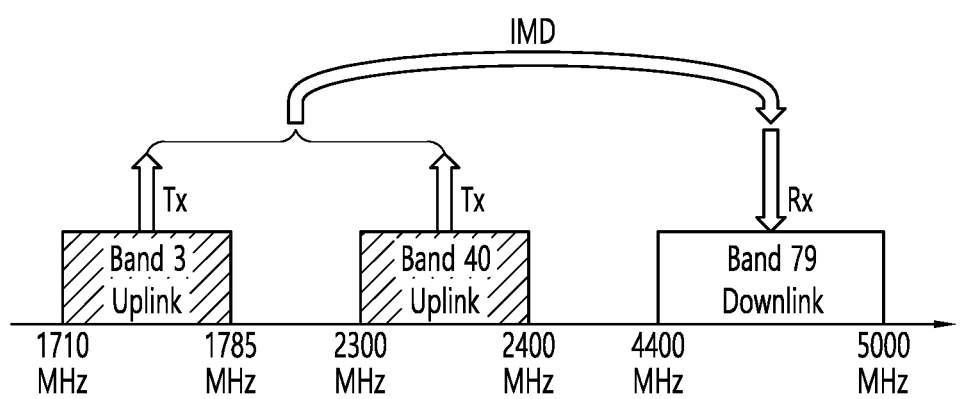
FIGS. 14A and 14B illustrate exemplary IMD by a combination of band 3, n40 and n79.
Figure 14B:
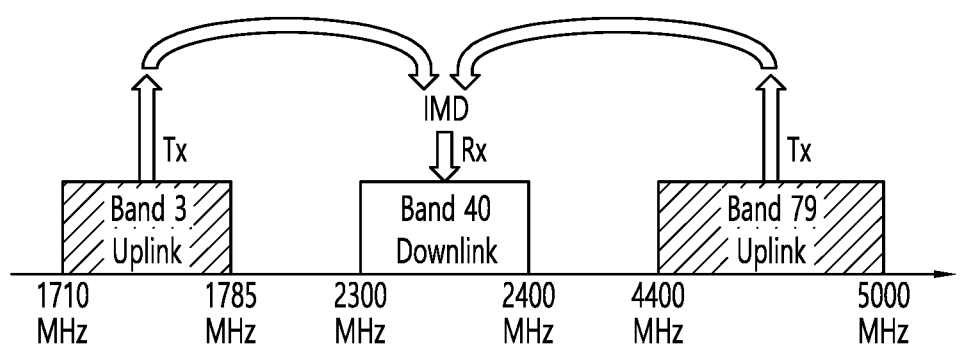

FIGS. 14a and 14b illustrate exemplary IMD by a combination of bands 3, n40 and n79.

There is IMD5 products produced by Band 3 and n40 that impact the reference sensitivity of NR n79. For example, as shown in FIG. 14a, if the UE transmits uplink signals via uplink bands of operating bands 3 and n40, IMD products are produced and then a reference sensitivity in operating band n79 is degraded. Therefore, a value of MSD is needed to apply the reference sensitivity.

In addition, there is IMD5 product produced by Band 3 and n79 that impact the reference sensitivity of NR Band n40. The required MSD are shown in the following table. For example, as shown in FIG. 14b, if the UE transmits uplink signals via uplink bands of operating bands 3 and n79, IMD products are produced and then a reference sensitivity in operating band n40 is degraded. Therefore, a value of MSD is needed to apply the reference sensitivity.

Below table shows MSD exception for Scell due to dual uplink operation for EN-DC_3A_n40A-n79A.

III-15. Proposed MSD level for DC_3_n41-n79

Figure 15:
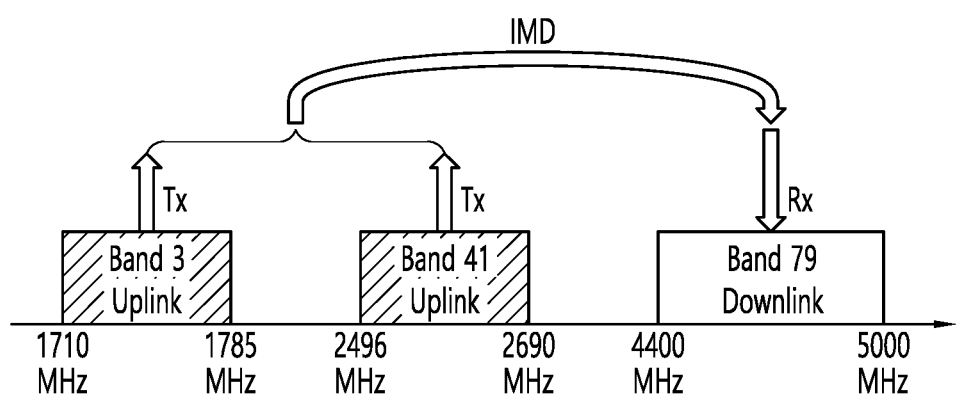
FIG. 15 illustrates exemplary IMD by a combination of bands 3, n41 and n79.

FIG. 15 illustrates exemplary IMD by a combination of bands 3, n41 and n79.

There are IMD2 & IMD5 products produced by Band 3 and n41 that impact the reference sensitivity of NR n79. The required MSD are shown in the following table. For example, as shown in FIG. 15, if the UE transmits uplink signals via uplink bands of operating bands 3 and n41, IMD products are produced and then a reference sensitivity in operating band n79 is degraded. Therefore, a value of MSD is needed to apply the reference sensitivity.

Below table shows MSD exception for Scell due to dual uplink operation for EN-DC_3_n41A-n79A.

TABLE 44

| DC bands | UL DC | IMD | | UL Fc (MHz) | UL BW (MHz) | UL RB # | DL Fc (MHz) | MSD (dB) |
|---|---|---|---|---|---|---|---|---|
| DC_3A__n40A-n79A | 3 | IMD 5 | $|4*f_{B3} - f_{n40}|$ | 1720 | 5 | 25 | 1815 | N/A |
| | n40 | | | 2330 | 5 | 25 | 2330 | |
| | n79 | | | 4550 | 40 | 216 | 4550 | 4.7 |
| | 3 | IMD 5 | $|4*f_{B3} - f_{n79}|$ | 1720 | 5 | 25 | 1815 | N/A |
| | n79 | | | 4550 | 40 | 216 | 4550 | |
| | n40 | | | 2330 | 5 | 25 | 2330 | 3.2 |

TABLE 45

| DC bands | UL DC | IMD | | UL Fc (MHz) | UL BW (MHz) | UL RB # | DL Fc (MHz) | MSD (dB) |
|---|---|---|---|---|---|---|---|---|
| DC_3A__n41A-n79A | 3 | IMD 2 | $|f_{B3} - f_{n41}|$ | 1770 | 5 | 25 | 1865 | N/A |
| | n41 | | | 2670 | 10 | 50 | 2670 | |
| | n79 | | | 4440 | 40 | 216 | 4440 | 30.8 |
| | 3 | IMD 5 | $|4*f_{B3} - f_{n41}|$ | 1770 | 5 | 25 | 1865 | N/A |
| | n41 | | | 2550 | 10 | 50 | 2550 | |
| | n79 | | | 4530 | 40 | 216 | 4530 | 5.2 |

III-16. Proposed MSD level for DC_8_n40A-n79A

Figure 16A:
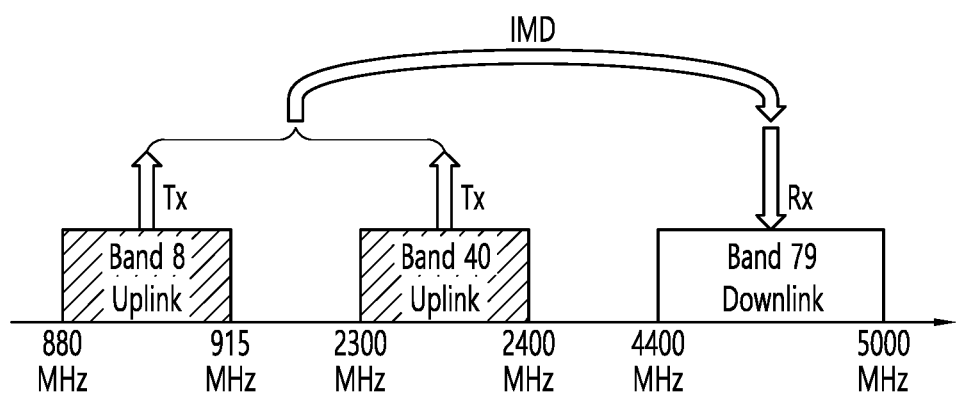
FIGS. 16A and 16B illustrate exemplary IMD by a combination of band 8, n40 and n79.
Figure 16B:
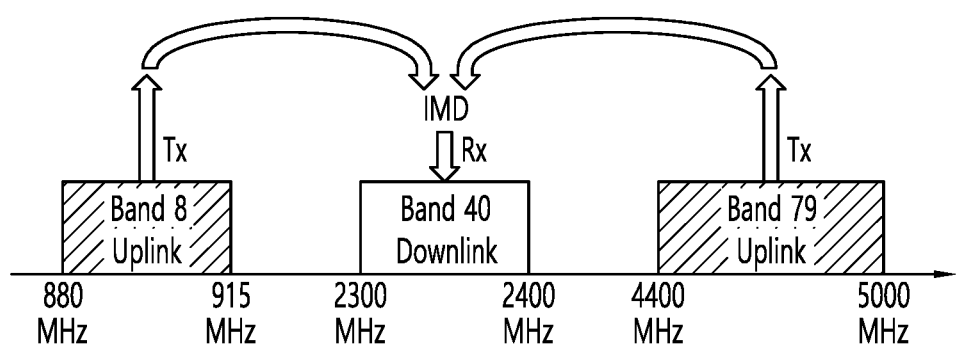

FIGS. 16a and 16b illustrate exemplary IMD by a combination of bands 8, n40 and n79.

There is IMD4 products produced by Band 8 and n40 that impact the reference sensitivity of NR n79. For example, as shown in FIG. 16a, if the UE transmits uplink signals via uplink bands of operating bands 8 and n40, IMD products are produced and then a reference sensitivity in operating band n79 is degraded. Therefore, a value of MSD is needed to apply the reference sensitivity.

In addition, there is IMD4 product produced by Band 8 and n79 that impact the reference sensitivity of NR Band n40. The required MSD are shown in the following table. For example, as shown in FIG. 16b, if the UE transmits uplink signals via uplink bands of operating bands 8 and n40, IMD products are produced and then a reference sensitivity in operating band n79 is degraded. Therefore, a value of MSD is needed to apply the reference sensitivity Below table shows MSD exception for Scell due to dual uplink operation for EN-DC 8A n40A-n79A.

TABLE 46

| DC bands | UL DC | IMD | | UL Fc (MHz) | UL BW (MHz) | UL RB # | DL Fc (MHz) | MSD (dB) |
|---|---|---|---|---|---|---|---|---|
| DC_8A__n40A-n79A | 8 | IMD 4 | $|3*f_{B8} + f_{n40}|$ | 885 | 5 | 25 | 930 | N/A |
| | n40 | | | 2305 | 5 | 25 | 2305 | |
| | n79 | | | 4960 | 40 | 216 | 4960 | 10.7 |
| | 8 | IMD 4 | $|3*f_{B8} - f_{n79}|$ | 885 | 5 | 25 | 930 | N/A |
| | n79 | | | 4960 | 40 | 216 | 4960 | |
| | n40 | | | 2305 | 5 | 25 | 2305 | 9.2 |

III-17. Proposed MSD level for DC_8_n41A-n79A

Figure 17A:
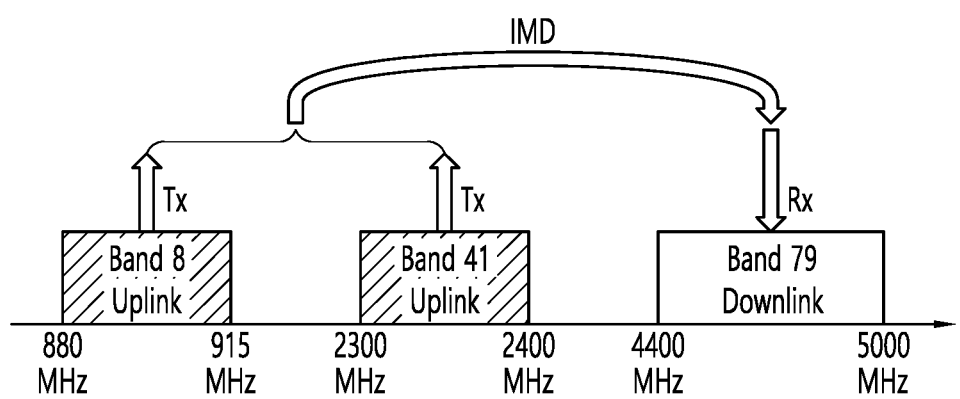
FIGS. 17A and 17B illustrate exemplary IMD by a combination of band 8, n41 and n79.
Figure 17B:
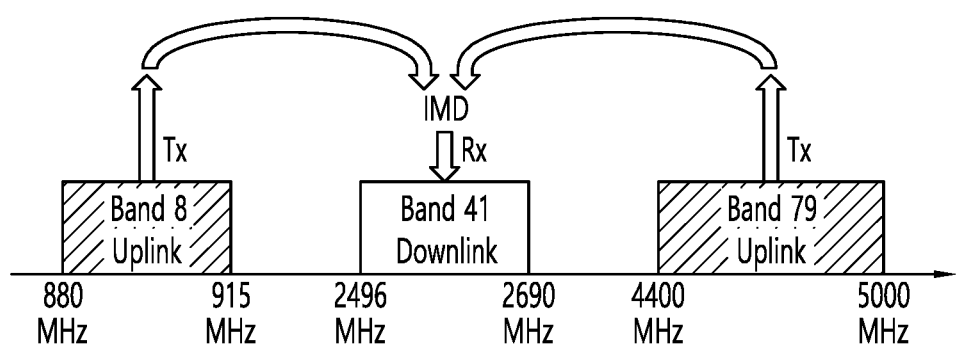

FIGS. 17a and 17b illustrate exemplary IMD by a combination of bands 8, n41 and n79.

There is IMD3 products produced by Band 8 and n41 that impact the reference sensitivity of NR n79. For example, as shown in FIG. 17a, if the UE transmits uplink signals via uplink bands of operating bands 8 and n41, IMD products are produced and then a reference sensitivity in operating band n79 is degraded. Therefore, a value of MSD is needed to apply the reference sensitivity.

In addition, there is IMD3 product produced by Band 8 and n79 that impact the reference sensitivity of NR Band n41. The required MSD are shown in the following table. For example, as shown in FIG. 17b, if the UE transmits uplink signals via uplink bands of operating bands 8 and n41, IMD products are produced and then a reference sensitivity in operating band n79 is degraded. Therefore, a value of MSD is needed to apply the reference sensitivity.

Below table shows MSD exception for Scell due to dual uplink operation for EN-DC 8A n41A-n79A.

TABLE 47

| DC bands | UL DC | IMD | | UL Fc (MHz) | UL BW (MHz) | UL RB # | DL Fc (MHz) | MSD (dB) |
|---|---|---|---|---|---|---|---|---|
| DC_8A__n41A-n79A | 8 | IMD 3 | $|2*f_{B8} + f_{n41}|$ | 910 | 5 | 25 | 955 | N/A |
| | n41 | | | 2650 | 10 | 50 | 2650 | |
| | n79 | | | 4470 | 40 | 216 | 4470 | 16.3 |
| | 8 | IMD 3 | $|2*f_{B8} - f_{n79}|$ | 910 | 5 | 25 | 955 | N/A |
| | n79 | | | 4470 | 40 | 216 | 4470 | |
| | n41 | | | 2650 | 10 | 50 | 2650 | 15.5 |

III-18. Proposed MSD level for DC_39_n40-n79

Figure 18:
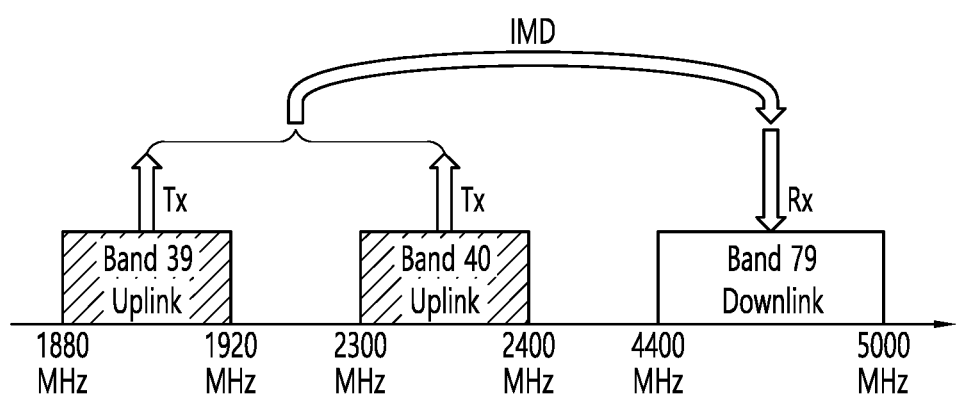
FIG. 18 illustrates exemplary IMD by a combination of bands 39, n40 and n79.

FIG. 18 illustrates exemplary IMD by a combination of bands 39, n40 and n79.

There is IMD4 products produced by Band 30 and n40 that impact the reference sensitivity of NR band n79. The required MSD is shown in the following table. For example, as shown in FIG. 18, if the UE transmits uplink signals via uplink bands of operating bands 39 and n40, IMD products are produced and then a reference sensitivity in operating band n79 is degraded. Therefore, a value of MSD is needed to apply the reference sensitivity.

Below table shows a MSD exception for Scell due to dual uplink operation for EN-DC_39_n40A-n79A.

TABLE 48

| DC bands | UL DC | IMD | | UL Fc (MHz) | UL BW (MHz) | UL RB # | DL Fc (MHz) | MSD (dB) |
|---|---|---|---|---|---|---|---|---|
| DC_39A_n40A-n79A | 39 | IMD 4 | $\|f_{B39} - 3*f_{n40}\|$ | 1917.5 | 5 | 25 | 1917.5 | N/A |
| | n40 | | | 2302.5 | 5 | 25 | 2302.5 | |
| | n79 | | | 4980 | 40 | 216 | 4980 | 5.8 |

III-19. Proposed MSD level for DC_8_n3-n28

Figure 19:
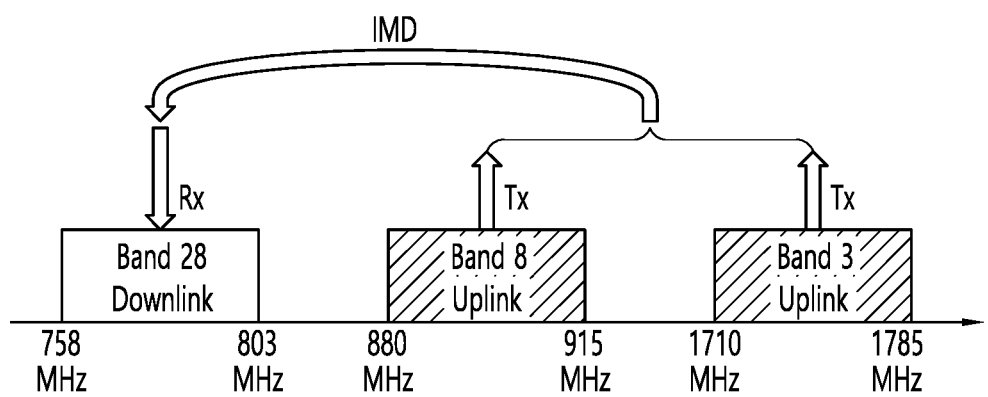
FIG. 19 illustrates exemplary IMD by a combination of bands 8, n3 and n28.

FIG. 19 illustrates exemplary IMD by a combination of bands 8, n3 and n28.

There are IMD2 & IMD5 products produced by Band 8 and n3 that impact the reference sensitivity of NR n28. The required MSD are shown in the following table. For example, as shown in FIG. 19, if the UE transmits uplink signals via uplink bands of operating bands 8 and n3, IMD products are produced and then a reference sensitivity in operating band n28 is degraded. Therefore, a value of MSD is needed to apply the reference sensitivity.

Below table shows MSD exception for Scell due to dual uplink operation for EN-DC_8_n3A-n28A.

TABLE 49

| DC bands | UL DC | IMD | | UL Fc (MHz) | UL BW (MHz) | UL RB # | DL Fc (MHz) | MSD (dB) |
|---|---|---|---|---|---|---|---|---|
| DC_8A_n3A-n28A | 8 | IMD 2 | $\|f_{B8} - f_{n3}\|$ | 912.5 | 5 | 25 | 957.5 | N/A |
| | n3 | | | 1712.5 | 5 | 25 | 1807.5 | |
| | n28 | | | 745 | 5 | 25 | 800 | 30.4 |
| | 8 | IMD 5 | $\|3*f_{B8} - 2*f_{n3}\|$ | 910 | 5 | 25 | 955 | N/A |
| | n3 | | | 1750 | 5 | 25 | 1845 | |
| | n28 | | | 715 | 5 | 25 | 770 | 2.6 |

III-20. Proposed MSD level for DC_7-7_n66-n78

There is IMD3 products produced by Band 7-7 and n66 that impact the reference sensitivity of NR band n78. The required MSD is shown in the following table.

Below table shows a MSD exception for Scell due to dual uplink operation for EN-DC_7A-7A_n66A-n78A.

TABLE 50

| DC bands | UL DC | IMD | | UL Fc (MHz) | UL BW (MHz) | UL RB # | DL Fc (MHz) | MSD (dB) |
|---|---|---|---|---|---|---|---|---|
| DC_7A-7A_n66A-n78A | 7 | IMD 3 | $\|2*f_{B7} - f_{n66}\|$ | 2555 | 5 | 25 | 2675 | N/A |
| | n66 | | | 1740 | 5 | 25 | 2140 | |
| | n78 | | | 3370 | 10 | 50 | 3370 | 15.1 |

<Embodiment of the Present Disclosure>

The disclosure of this specification provides a device configured to operate in a wireless system. The device may comprise: a transceiver configured with an Evolved Universal Terrestrial Radio Access (E-UTRA)-New Radio (NR) Dual Connectivity (EN-DC). The EN-DC may be configured to use three bands. The device may comprise: a processor operably connectable to the transceiver. The processer may be configured to: control the transceiver to receive a downlink signal and control the transceiver to transmit an uplink signal via at least two bands among the three bands. A value of Maximum Sensitivity Degradation (MSD) may be applied to a reference sensitivity for receiving the downlink signal. The value of the MSD may be pre-configured for a first combination of bands 39, n41 and n79, a second combination of bands 2, n66 and n78, a third combination of bands 7, n66 and n78, a fourth combination of bands 2, n41 and n71, a fifth combination of bands 18, n3 and n78, a sixth combination of bands 8, n1 and n78, a seventh combination of bands 3, n40 and n79, an eighth combination of bands 3, n41 and n79, a ninth combination of bands 8, n40 and n79, a tenth combination of bands 8, n41 and n79, an eleventh combination of bands 39, n40 and n79 or a twelfth combination of bands 8, n3 and n28.

The value of the MSD may be 29.8 dB for band 79 based on the first combination of bands 39, n41 and n79.

The value of the MSD may be 30.2 dB for band 41 based on the first combination of band 39, n41 and n79.

The value of the MSD may be 29.4 dB for band 78 based on the second combination of bands 2, n66 and n78.

The value of the MSD may be 8.9 dB for band 78 based on the second combination of bands 2, n66 and n78.

The value of the MSD may be 16.0 dB for band 78 based on the third combination of bands 7, n66 and n78.

The value of the MSD may be 28.7 dB for band 71 based on the fourth combination of bands 2, n41 and n71.

The value of the MSD may be 29.2 dB for band 41 based on the fourth combination of bands 2, n41 and n71.

The value of the MSD may be 15.2 dB for band 78 based on the fifth combination of bands 18, n3 and n78.

The value of the MSD may be 14.9 dB for band 78 based on the sixth combination of bands 8, n1 and n78.

The value of the MSD may be 4.7 dB for band 79 based on the seventh combination of bands 3, n40 and n79.

The value of the MSD may be 3.2 dB for band 40 based on the seventh combination of bands 3, n40 and n79.

The value of the MSD may be 30.8 dB for band 79 based on the eighth combination of bands 3, n41 and n79.

The value of the MSD may be 10.7 dB for band 79 based on the ninth combination of bands 8, n40 and n79.

The value of the MSD may be 16.3 dB for band 79 based on the tenth combination of bands 8, n41 and n79.

The value of the MSD may be 15.5 dB for band 41 based on the tenth combination of bands 8, n41 and n79.

The value of the MSD may be 5.8 dB for band 79 based on the eleventh combination of bands 39, n40 and n79.

The value of the MSD may be 30.4 dB for band 28 based on the twelfth combination of bands 8, n3 and n28.

For the first combination of band 39, n41 and n79, the band 39 may be used for the E-UTRA and the bands n41 and n79 may be used for the NR.

For the second combination of bands 2, n66 and n78, the band 2 may be used for the E-UTRA and the bands n66 and n78 may be used for the NR.

For the third combination of bands 7, n66 and n78, the band 7 may be used for the E-UTRA and the bands n66 and n78 may be used for the NR.

For the fourth combination of bands 2, n41 and n71, the band 2 may be used for the E-UTRA and the bands n41 and n71 may be used for the NR.

For the fifth combination of bands 18, n3 and n78, the band 18 may be used for the E-UTRA and the bands n3 and n78 may be used for the NR.

For the sixth combination of bands 8, n1 and n78, the band 8 may be used for the E-UTRA and the bands n1 and n78 may be used for the NR.

For the seventh combination of bands 3, n40 and n79, the band 3 may be used for the E-UTRA and the bands n40 and n79 may be used for the NR.

For the eighth combination of bands 3, n41 and n79, the band 3 may be used for the E-UTRA and the bands n41 and n79 may be used for the NR.

For the ninth combination of bands 8, n40 and n79, the band 8 may be used for the E-UTRA and the bands n40 and n79 may be used for the NR.

For the tenth combination of bands 8, n41 and n79, the band 8 may be used for the E-UTRA and the bands n41 and n79 may be used for the NR.

For the eleventh combination of bands 39, n40 and n79, the band 39 may be used for the E-UTRA and the bands n40 and n79 may be used for the NR.

For the twelfth combination of bands 8, n3 and n28, the band 8 may be used for the E-UTRA and the bands n3 and n28 may be used for the NR.

<Communication System to which the Disclosure of this Specification is to be Applied>

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 20:
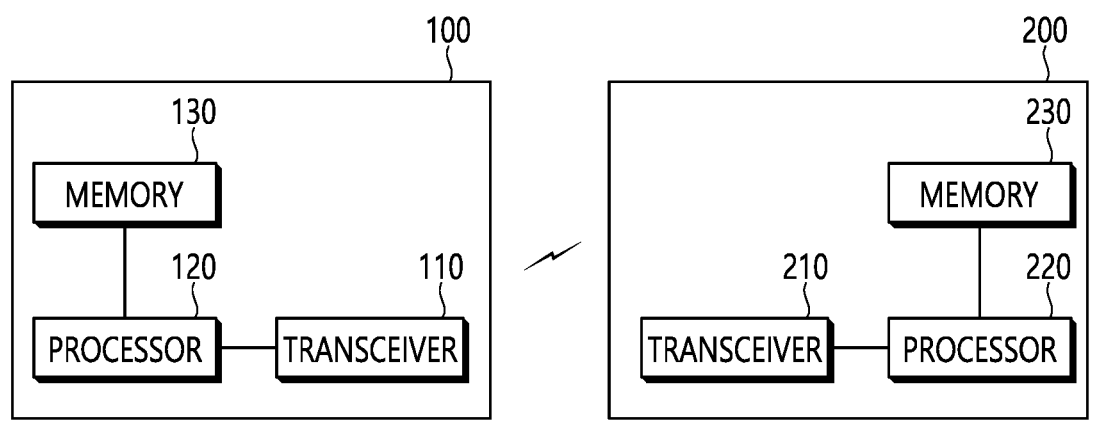
FIG. 20 is a block diagram illustrating a wireless device and a base station, by which the disclosure of this specification can be implemented.

FIG. 20 is a block diagram illustrating a wireless device and a base station, by which the disclosure of this specification can be implemented.

Referring to FIG. 20, a wireless device 100 and a base station 200 may implement the disclosure of this specification.

The wireless device 100 includes a processor 120, a memory 130, and a transceiver 110. Likewise, the base station 200 includes a processor 220, a memory 230, and a transceiver 210. The processors 120 and 220, the memories 130 and 230, and the transceivers 110 and 210 may be implemented as separate chips, or at least two or more blocks/functions may be implemented through one chip.

Each of the transceivers 110 and 210 includes a transmitter and a receiver. When a particular operation is performed, either or both of the transmitter and the receiver may operate. Each of the transceivers 110 and 210 may include one or more antennas for transmitting and/or receiving a radio signal. In addition, each of the transceivers 110 and 210 may include an amplifier configured for amplifying a Rx signal and/or a Tx signal, and a band pass filter for transmitting a signal to a particular frequency band.

Each of the processors 120 and 220 may implement functions, procedures, and/or methods proposed in this specification. Each of the processors 120 and 220 may include an encoder and a decoder. For example, each of the processors 120 and 230 may perform operations described above. Each of the processors 120 and 220 may include an application-specific integrated circuit (ASIC), a different chipset, a logic circuit, a data processing device, and/or a converter which converts a base band signal and a radio signal into each other.

Each of the memories 130 and 230 may include a Read-Only Memory (ROM), a Random Access Memory (RAM), a flash memory, a memory card, a storage medium, and/or any other storage device.

Figure 21:
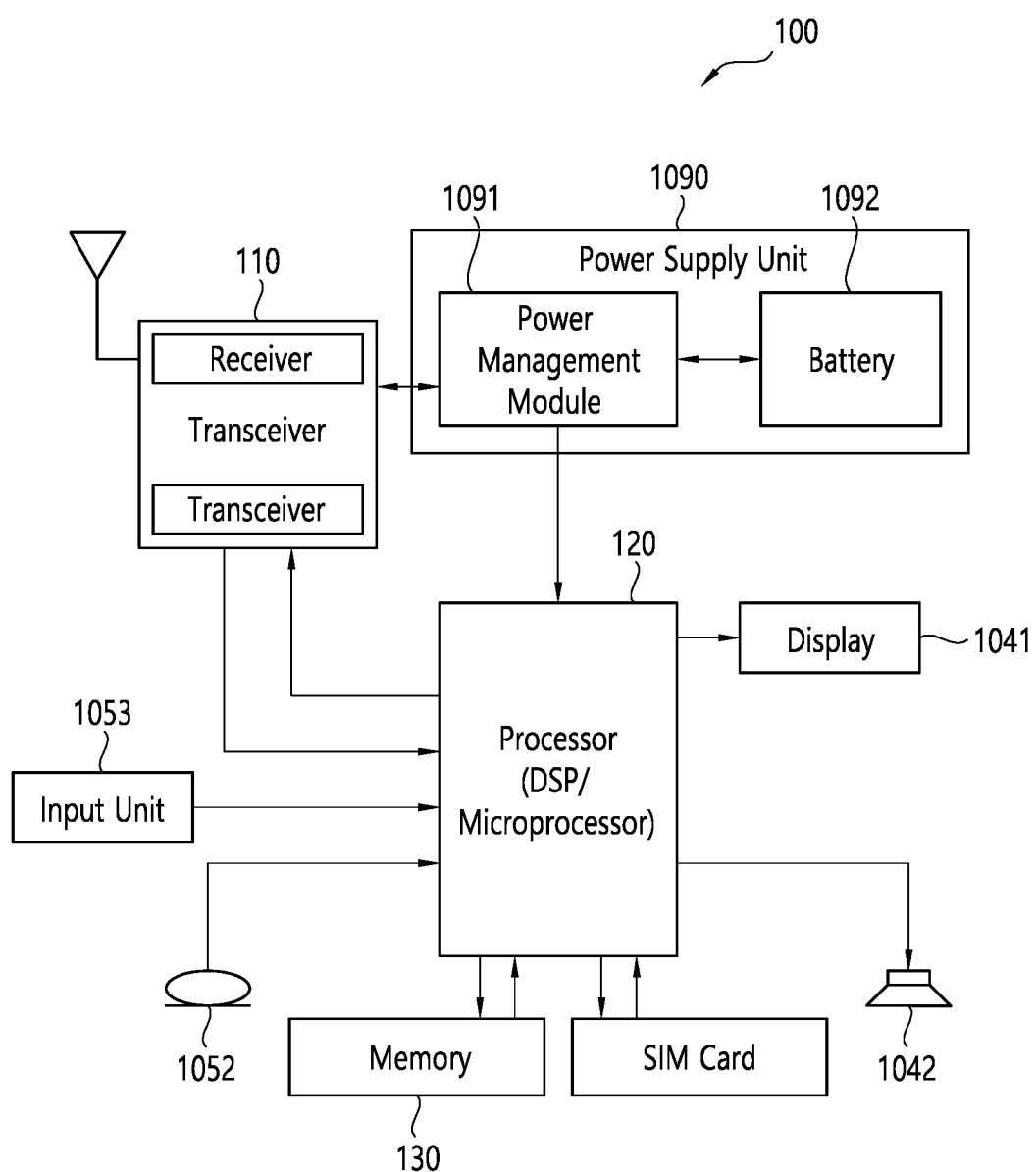
FIG. 21 is a block diagram showing a detail structure of the wireless device shown in FIG. 20.

FIG. 21 is a block diagram showing a detail structure of the wireless device shown in FIG. 20.

In particular, FIG. 21 shows an example of the wireless device of FIG. 20 in greater detail.

A wireless device includes a memory 130, a processor 120, a transceiver 110, a power management module 1091, a battery 1092, a display 1041, an input unit 1053, a speaker 1042, a microphone 1052, a subscriber identification module (SIM) card, and one or more antennas.

The processor 120 may be configured to implement the proposed functions, procedures, and/or methods described in the present specification. Layers of a radio interface protocol may be implemented in the processor 120. The processor 120 may include application-specific integrated circuits (ASICs), other chipsets, logic circuits, and/or data processing units. The processor 120 may be an application processor (AP). The processor 120 may include at least one of a digital signal processor (DSP), a central processing unit (CPU), a graphics processing unit (GPS), and a modulator and demodulator (modem). An example of the processor 120 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

The power management module 1091 manages power for the processor 120 and/or the transceiver 110. The battery 1092 supplies power to the power management module 1091. The display 1041 outputs a result processed by the processor 120. The input unit 1053 receives an input to be used by the processor 120. The input unit 1053 may be displayed on the display 1041. The SIM card is an integrated circuit used to safely store an international mobile subscriber identity (IMSI) used to identify and authenticate a subscriber and a key related thereto in a portable phone and a portable phone device such as a computer. Contacts information may be stored in many SIM cards.

The memory 130 is operatively coupled to the processor 120, and stores a variety of information for operating the processor 120. The memory 130 may include a read-only memory (ROM), a random access memory (RAM), a flash memory, a memory card, a storage medium, and/or other equivalent storage devices. When the embodiment is implemented in software, the techniques explained in the present specification can be implemented with a module (i.e., procedure, function, etc.) for performing the functions explained in the present specification. The module may be stored in the memory 130 and may be performed by the processor 120. The memory 130 may be implemented inside the processor 120. Alternatively, the memory 130 may be implemented outside the processor 120, and may be coupled to the processor 120 in a communicable manner by using various well-known means.

The transceiver 110 is operatively coupled to the processor 120, and transmits and/or receives a radio signal. The transceiver 110 includes a transmitter and a receiver. The transceiver 110 may include a baseband signal for processing a radio frequency signal. The transceiver controls one or more antennas to transmit and/or receive a radio signal. In order to initiate communication, the processor 120 transfers command information to the transceiver 110, for example, to transmit a radio signal constituting voice communication data. The antenna serves to transmit and receive a radio signal. When the radio signal is received, the transceiver 110 may transfer a signal to be processed by the processor 120, and may convert the signal into a baseband signal.

The processed signal may be converted into audible or readable information which is output through the speaker 1042.

The speaker 1042 outputs a result related to a sound processed by the processor 120. The microphone 1052 receives a sound-related input to be used by the processor 120.

A user presses (or touches) a button of the input unit 1053 or drives voice (activates voice) by using the microphone 1052 to input command information such as a phone number or the like. The processor 120 receives the command information, and performs a proper function such as calling the phone number or the like. Operational data may be extracted from the SIM card or the memory 130. In addition, the processor 120 may display command information or operational information on the display 1041 for user's recognition and convenience.

Figure 22:
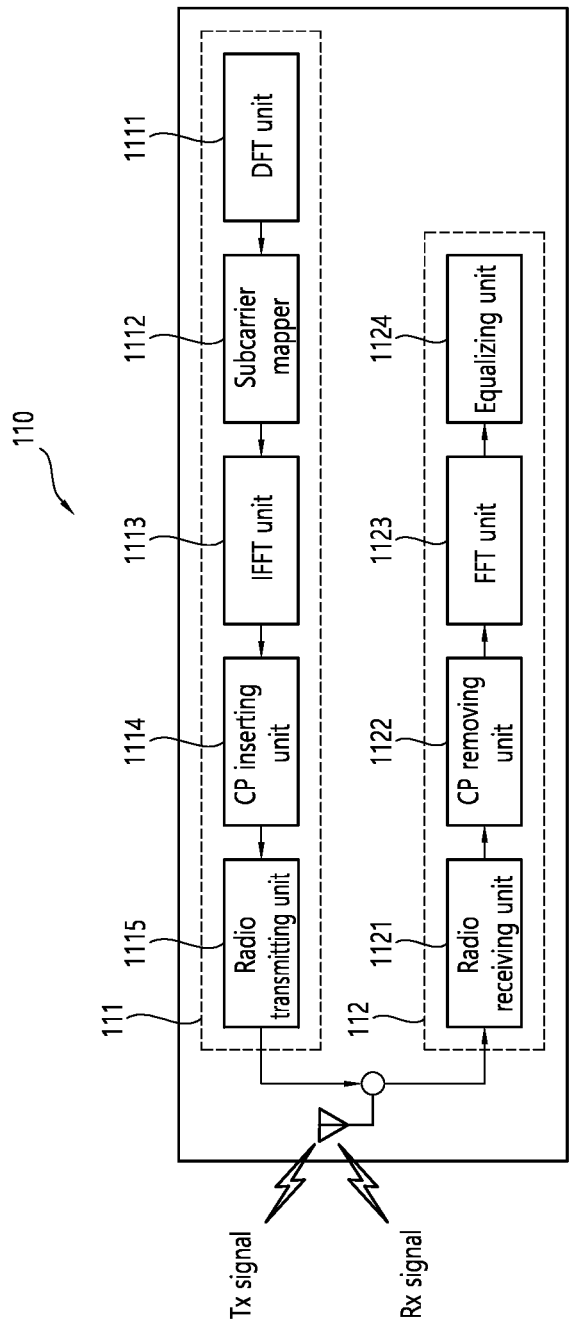
FIG. 22 is a detailed block diagram illustrating a transceiver of the wireless device shown in FIG. 20 and FIG. 21.

FIG. 22 is a detailed block diagram illustrating a transceiver of the wireless device shown in FIG. 20 and FIG. 21.

Referring to FIG. 22, a transceiver 110 includes a transmitter 111 and a receiver 112. The transmitter 111 includes a Discrete Fourier Transform (DFT) unit 1111, a subcarrier mapper 1112, an IFFT unit 1113, a CP insertion unit 1114, a wireless transmitter 1115. In addition, the transceiver 1110 may further include a scramble unit (not shown), a modulation mapper (not shown), a layer mapper (not shown), and a layer permutator, and the transceiver 110 may be disposed in front of the DFT unit 1111. That is, in order to prevent a peak-to-average power ratio (PAPR) from increasing, the transmitter 111 may transmit information to pass through the DFT unit 1111 before mapping a signal to a subcarrier. A signal spread (or pre-coded for the same meaning) by the DFT unit 111 is subcarrier-mapped by the subcarrier mapper 1112, and then generated as a time domain signal by passing through the IFFT unit 1113.

The DFT unit 111 performs DFT on input symbols to output complex-valued symbols. For example, if Ntx symbols are input (here, Ntx is a natural number), a DFT size may be Ntx. The DFT unit 1111 may be called a transform precoder. The subcarrier mapper 1112 maps the complex-valued symbols to subcarriers of a frequency domain. The complex-valued symbols may be mapped to resource elements corresponding to a resource block allocated for data transmission. The subcarrier mapper 1112 may be called a resource element mapper. The IFFT unit 113 may perform IFFT on input symbols to output a baseband signal for data, which is a time-domain signal. The CP inserter 1114 copies a rear portion of the baseband signal for data and inserts the copied portion into a front part of the baseband signal. The CP insertion prevents Inter-Symbol Interference (ISI) and Inter-Carrier Interference (ICI), and therefore, orthogonality may be maintained even in multi-path channels.

Meanwhile, the receiver 112 includes a wireless receiver 1121, a CP remover 1122, an FFT unit 1123, and an equalizer 1124, and so on. The wireless receiver 1121, the CP remover 1122, and the FFT unit 1123 of the receiver 112 performs functions inverse to functions of the wireless transmitter 1115, the CP inserter 1114, and the IFFT unit 113 of the transmitter 111. The receiver 112 may further include a demodulator.

Figure 23:
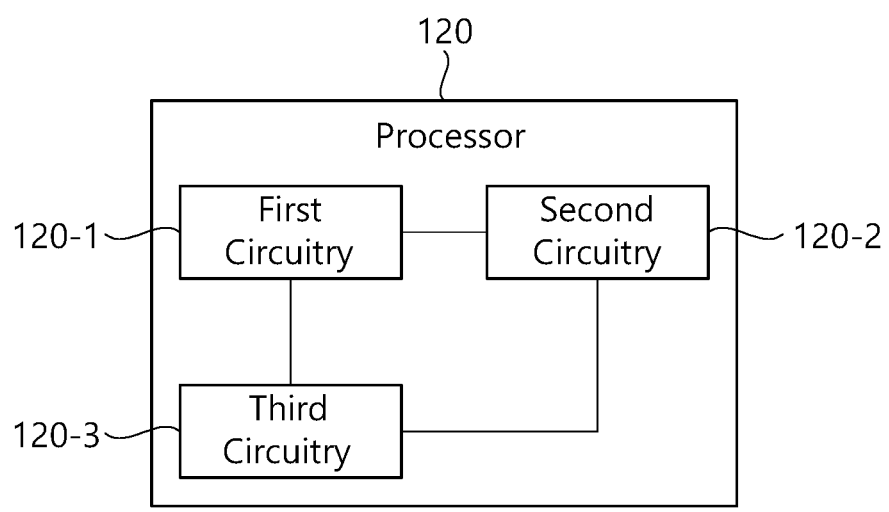
FIG. 23 illustrates a detailed block diagram illustrating a processor of the wireless device shown in FIG. 20 and FIG. 21.

FIG. 23 illustrates a detailed block diagram illustrating a processor of the wireless device shown in FIG. 20 and FIG. 21.

Referring to FIG. 23, the processor 120 as illustrated in FIG. 20 and FIG. 21 may comprise a plurality of circuitries such as. a first circuitry 120-1, a second circuitry 120-2 and a third circuitry 120-3.

The plurality of circuitries may be configured to implement the proposed functions, procedures, and/or methods described in the present specification.

The processor 120 may include application-specific integrated circuits (ASICs), other chipsets, logic circuits, and/or data processing units. The processor 120 may be an application processor (AP). The processor 120 may include at least one of a digital signal processor (DSP), a central processing unit (CPU), a graphics processing unit (GPS), and a modulator and demodulator (modem). An example of the processor 120 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 24:
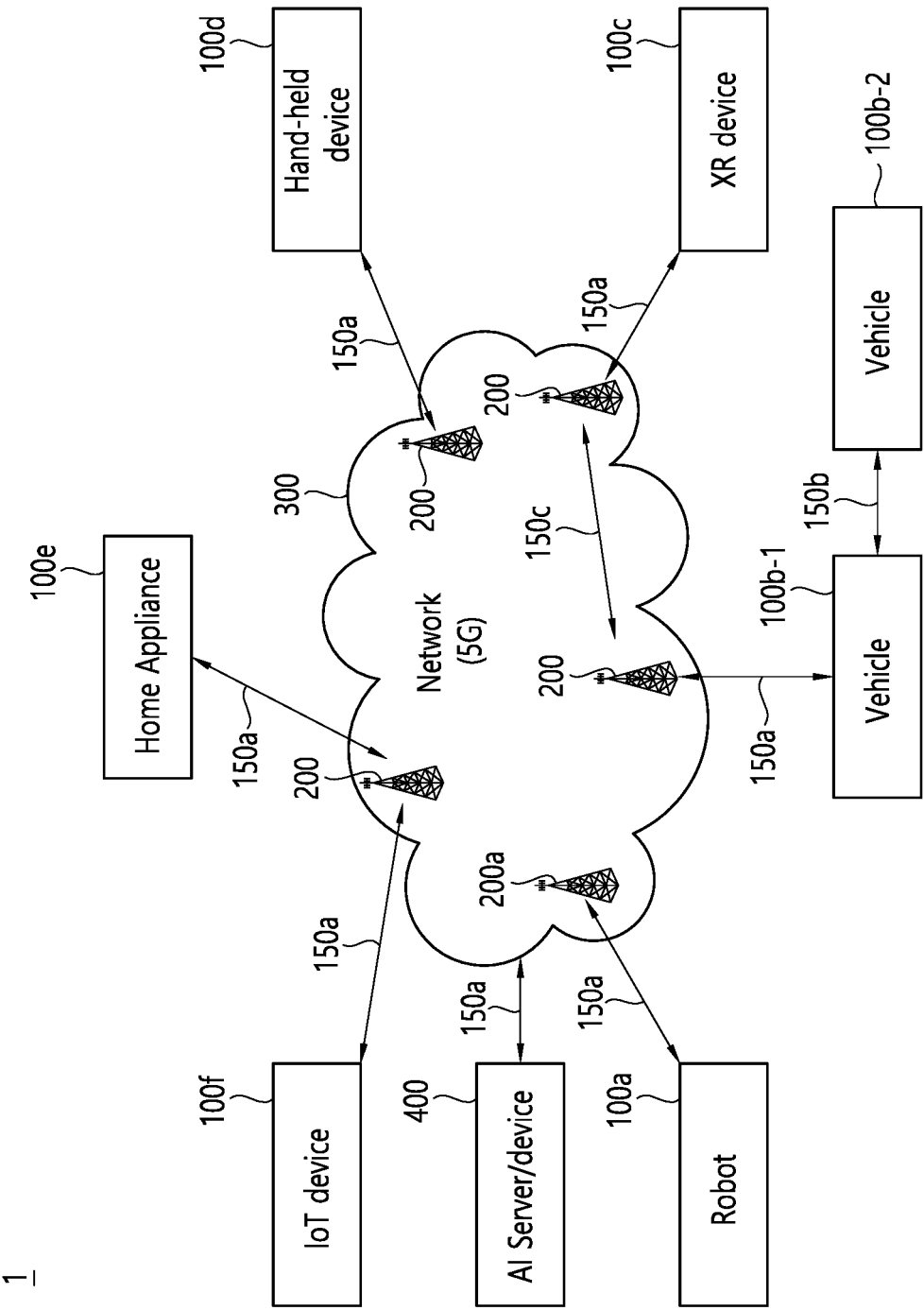
FIG. 24 illustrates a communication system that can be applied to the present specification.

FIG. 24 illustrates a communication system that can be applied to the present specification.

Referring to FIG. 24, a communication system applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device.

Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like.

Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like.

The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300.

The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like.

The wireless device and the base station/wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification. At least some of various configuration information setting processes for transmitting/receiving a wireless signal, various signal processing processes (e.g., channel encoding/decoding, modulation/demodulation, resource mapping/demapping, etc.) may be performed.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A device configured to operate in a wireless system, the device comprising:
    a transceiver configured with an Evolved Universal Terrestrial Radio Access (E-UTRA)-New Radio (NR) Dual Connectivity (EN-DC),
    wherein the EN-DC is configured to use three bands,
    a processor operably connectable to the transceiver,
    wherein the processor is configured to:
    control the transceiver to receive a downlink signal,
    control the transceiver to transmit an uplink signal via at least two bands among the three bands,
    wherein a value of Maximum Sensitivity Degradation (MSD) is applied to a reference sensitivity,
    wherein the value of the MSD is pre-configured for one or more band combinations,
    wherein the one or more of band combinations include a first combination of bands 39, n41 and n79, a second combination of bands 2, n66 and n78, a third combination of bands 7, n66 and n78, a fourth combination of bands 2, n41 and n71, a fifth combination of bands 18, n3 and n78, a sixth combination of bands 8, n1 and n78, a seventh combination of bands 3, n40 and n79, an eighth combination of bands 3, n41 and n79, a ninth combination of bands 8, n40 and n79, a tenth combination of bands 8, n41 and n79, an eleventh combination of bands 39, n40 and n79 or a twelfth combination of bands 8, n3 and n28.

2. The device of claim 1,
    wherein the value of the MSD is 29.8 dB by 2nd IMD for band n79 based on the first combination of bands 39, n41 and n79.

3. The device of claim 1,
    wherein the value of the MSD is 30.2 dB by 2nd IMD for band n41 based on the first combination of band 39, n41 and n79.

4. The device of claim 1,
    wherein the value of the MSD is 29.4 dB by 2nd IMD or 8.9 dB by 4th IMD for band n78 based on the second combination of bands 2, n66 and n78.

5. The device of claim 1,
    wherein the value of the MSD is 16.0 dB by 3rd IMD for band n78 based on the third combination of bands 7, n66 and n78.

6. The device of claim 1,
    wherein the value of the MSD is 28.7 dB by 2nd IMD for band n71 based on the fourth combination of bands 2, n41 and n71.

7. The device of claim 1,
    wherein the value of the MSD is 29.2 dB by 2nd IMD for band n41 based on the fourth combination of bands 2, n41 and n71.

8. The device of claim 1,
    wherein the value of the MSD is 15.2 dB by 3rd IMD for band n78 based on the fifth combination of bands 18, n3 and n78.

9. The device of claim 1,
wherein the value of the MSD is 14.9 dB by 3rd IMD for band n78 based on the sixth combination of bands 8, n1 and n78.

10. The device of claim 1,
wherein the value of the MSD is 4.7 dB by 5th IMD for band n79 based on the seventh combination of bands 3, n40 and n79.

11. The device of claim 1,
wherein the value of the MSD is 3.2 dB by 5th IMD for band n40 based on the seventh combination of bands 3, n40 and n79.

12. The device of claim 1,
wherein the value of the MSD is 30.8 dB by 2nd IMD for band n79 based on the eighth combination of bands 3, n41 and n79.

13. The device of claim 1,
wherein the value of the MSD is 10.7 dB by 4th IMD for band n79 based on the ninth combination of bands 8, n40 and n79.

14. The device of claim 1,
wherein the value of the MSD is 16.3 dB by 3rd IMD for band n79 based on the tenth combination of bands 8, n41 and n79.

15. The device of claim 1,
wherein the value of the MSD is 15.5 dB by 3rd IMD for band n41 based on the tenth combination of bands 8, n41 and n79.

16. The device of claim 1,
wherein the value of the MSD is 5.8 dB by 4th IMD for band n79 based on the eleventh combination of bands 39, n40 and n79.

17. The device of claim 1,
wherein the value of the MSD is 30.4 dB by 2nd IMD for band n28 based on the twelfth combination of bands 8, n3 and n28.

18. The device of claim 1,
wherein for the first combination of bands 39, n41 and n79, the band 39 is used for the E-UTRA and the bands n41 and n79 are used for the NR,
wherein for the second combination of bands 2, n66 and n78, the band 2 is used for the E-UTRA and the bands n66 and n78 are used for the NR,
wherein for the third combination of bands 7, n66 and n78, the band 7 is used for the E-UTRA and the bands n66 and n78 are used for the NR,
wherein for the fourth combination of bands 2, n41 and n71, the band 2 is used for the E-UTRA and the bands n41 and n71 are used for the NR,
wherein for the fifth combination of bands 18, n3 and n78, the band 18 is used for the E-UTRA and the bands n3 and n78 are used for the NR,
wherein for the sixth combination of bands 8, n1 and n78, the band 8 is used for the E-UTRA and the bands n1 and n78 are used for the NR,
wherein for the seventh combination of bands 3, n40 and n79, the band 3 is used for the E-UTRA and the bands n40 and n79 are used for the NR,
wherein for the eighth combination of bands 3n41 and n79, the band 3 is used for the E-UTRA and the bands n41 and n79 are used for the NR,
wherein for the ninth combination of bands 8, n40 and n79, the band 8 is used for the E-UTRA and the bands n40 and n79 are used for the NR,
wherein for the tenth combination of bands 8, n41 and n79, the band 8 is used for the E-UTRA and the bands n41 and n79 are used for the NR,
wherein for the eleventh combination of bands 39, n40 and n79, the band 39 is used for the E-UTRA and the bands n40 and n79 are used for the NR,
wherein for the twelfth combination of bands 8, n3 and n28, the band 8 is used for the E-UTRA and the bands n3 and n28 are used for the NR.

19. A method performed by a device comprising:
transmitting an uplink signal via at least two bands among three bands; and
receiving a downlink signal,
wherein the at least two bands are configured for an Evolved Universal Terrestrial Radio Access (E-UTRA)-New Radio (NR) Dual Connectivity (EN-DC),
wherein a value of Maximum Sensitivity Degradation (MSD) is applied to a reference sensitivity,
wherein the value of the MSD is pre-configured for one or more band combinations,
wherein the one or more of band combinations include a first combination of bands 39, n41 and n79, a second combination of bands 2, n66 and n78, a third combination of bands 7, n66 and n78, a fourth combination of bands 2, n41 and n71, a fifth combination of bands 18, n3 and n78, a sixth combination of bands 8, n1 and n78, a seventh combination of bands 3, n40 and n79, an eighth combination of bands 3, n41 and n79, a ninth combination of bands 8, n40 and n79, a tenth combination of bands 8, n41 and n79, an eleventh combination of bands 39, n40 and n79 or a twelfth combination of bands 8, n3 and n28.

* * * * *